US010834595B2

United States Patent
Asai

(10) Patent No.: US 10,834,595 B2
(45) Date of Patent: Nov. 10, 2020

(54) SERVICE PROVIDING APPARATUS CONFIGURED TO CONTROL COMMUNICATION MODE BETWEEN COMMUNICATION TERMINALS, SERVICE COMMUNICATING SYSTEM, SERVICE PROVIDING METHOD AND RECORDING MEDIUM CONFIGURED TO PERFORM SAME

(71) Applicant: Takahiro Asai, Kanagawa (JP)

(72) Inventor: Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/313,230

(22) PCT Filed: Jul. 10, 2017

(86) PCT No.: PCT/JP2017/025077
§ 371 (c)(1),
(2) Date: Dec. 26, 2018

(87) PCT Pub. No.: WO2018/012444
PCT Pub. Date: Jan. 18, 2018

(65) Prior Publication Data
US 2019/0166499 A1    May 30, 2019

(30) Foreign Application Priority Data
Jul. 15, 2016   (JP) .................................. 2016-140782

(51) Int. Cl.
*H04W 12/00*   (2009.01)
*H04W 12/08*   (2009.01)
(Continued)

(52) U.S. Cl.
CPC ........... *H04W 12/08* (2013.01); *H04L 63/083* (2013.01); *H04L 63/101* (2013.01);
(Continued)

(58) Field of Classification Search
CPC ..... H04W 12/08; H04W 12/06; H04L 63/083; H04L 63/101; H04L 63/104
See application file for complete search history.

(56) References Cited

U.S. PATENT DOCUMENTS

2008/0289009 A1*  11/2008  Lee ..................... H04L 12/2818
                                                                 726/4
2010/0121954 A1*  5/2010  Yang .................... H04L 61/303
                                                                 709/225
(Continued)

FOREIGN PATENT DOCUMENTS

EP     3541104 A1    9/2019
JP   2007006248 A    1/2007
(Continued)

OTHER PUBLICATIONS

International Search Report (PCT/ISA/210) for PCT International Application No. PCT/JP2017/025077 dated Sep. 19, 2017.
(Continued)

*Primary Examiner* — Pakee Fang
(74) *Attorney, Agent, or Firm* — Harness, Dickey and Pierce, P.L.C.

(57) ABSTRACT

With respect to control on starting communication between communication terminals, the present service providing system uses a mode management database used for a login process and admits starting communication when the terminal ID of a source of communication and the terminal ID of a communication partner contain a common user ID, thereby being able to control starting communication after security is ensured without bothering to build an address list.

15 Claims, 22 Drawing Sheets

(51) Int. Cl.
*H04L 29/06* (2006.01)
*H04W 12/06* (2009.01)

(52) U.S. Cl.
CPC ....... *H04L 63/104* (2013.01); *H04W 12/0602* (2019.01); *H04W 12/0608* (2019.01)

(56) References Cited

U.S. PATENT DOCUMENTS

| | | |
|---|---|---|
| 2012/0314019 A1 | 12/2012 | Asai |
| 2013/0281063 A1* | 10/2013 | Jactat .................... H04W 12/08 455/411 |
| 2014/0189058 A1 | 7/2014 | Asai |
| 2014/0375757 A1 | 12/2014 | Asai |
| 2015/0189237 A1 | 7/2015 | Asai |
| 2015/0282233 A1* | 10/2015 | Homma .................. H04W 4/50 370/329 |
| 2015/0319100 A1 | 11/2015 | Asai |
| 2016/0088027 A1 | 3/2016 | Hinohara et al. |
| 2016/0088258 A1 | 3/2016 | Nagase et al. |
| 2016/0092947 A1 | 3/2016 | Nagase et al. |
| 2016/0099947 A1 | 4/2016 | Asai et al. |
| 2017/0171186 A1* | 6/2017 | Purushothaman .... H04L 63/083 |
| 2018/0035294 A1* | 2/2018 | Reunamaki ............. G06F 21/62 |

FOREIGN PATENT DOCUMENTS

| | | |
|---|---|---|
| JP | 2015091017 A | 5/2015 |
| JP | 2015201827 A | 11/2015 |
| JP | 2016517977 A | 6/2016 |
| WO | WO-2014/158222 A1 | 10/2014 |

OTHER PUBLICATIONS

Written Opinion (PCT/ISA/237) for PCT International Application No. PCT/JP2017/025077 dated Sep. 19, 2017.
Notice of Allowance dated Jul. 2, 2020 in corresponding Korean Patent Application No. 10-2019-7000646.

* cited by examiner

FIG.8

| TERMINAL ID | COMMUNICATION MODE | IP ADDRESS |
|---|---|---|
| asai@myhost.ricoo.com/theta1 | ONLINE | 1.2.1.3 |
| asai@myhost.ricoo.com/pc | ONLINE | 1.2.1.4 |
| asai@myhost.ricoo.com/car | ONLINE | 1.2.1.5 |
| ... | ... | ... |
| jim@myhost.obrom.com/theta2 | OFFLINE (1) | 1.2.2.3 |
| jim@myhost.obrom.com/camera3 | OFFLINE (2) | 1.2.3.3 |
| ... | | ... |

FIG.10A

| USER ID (PART TO BE AUTHENTICATED) | PASSWORD |
|---|---|
| asai@myhost.ricoo.com | aaaa |
| jim@myhost.obrom.com | abab |
| ... | ... |

FIG.10B

| USER ID (PART TO BE AUTHENTICATED) | PASSWORD |
|---|---|
| asai | baba |
| kurt | bbbb |
| ... | ... |

FIG.10C

| USER ID (PART TO BE AUTHENTICATED) | PASSWORD |
|---|---|
| kondo | caca |
| kulbaski | cccc |
| ... | ... |

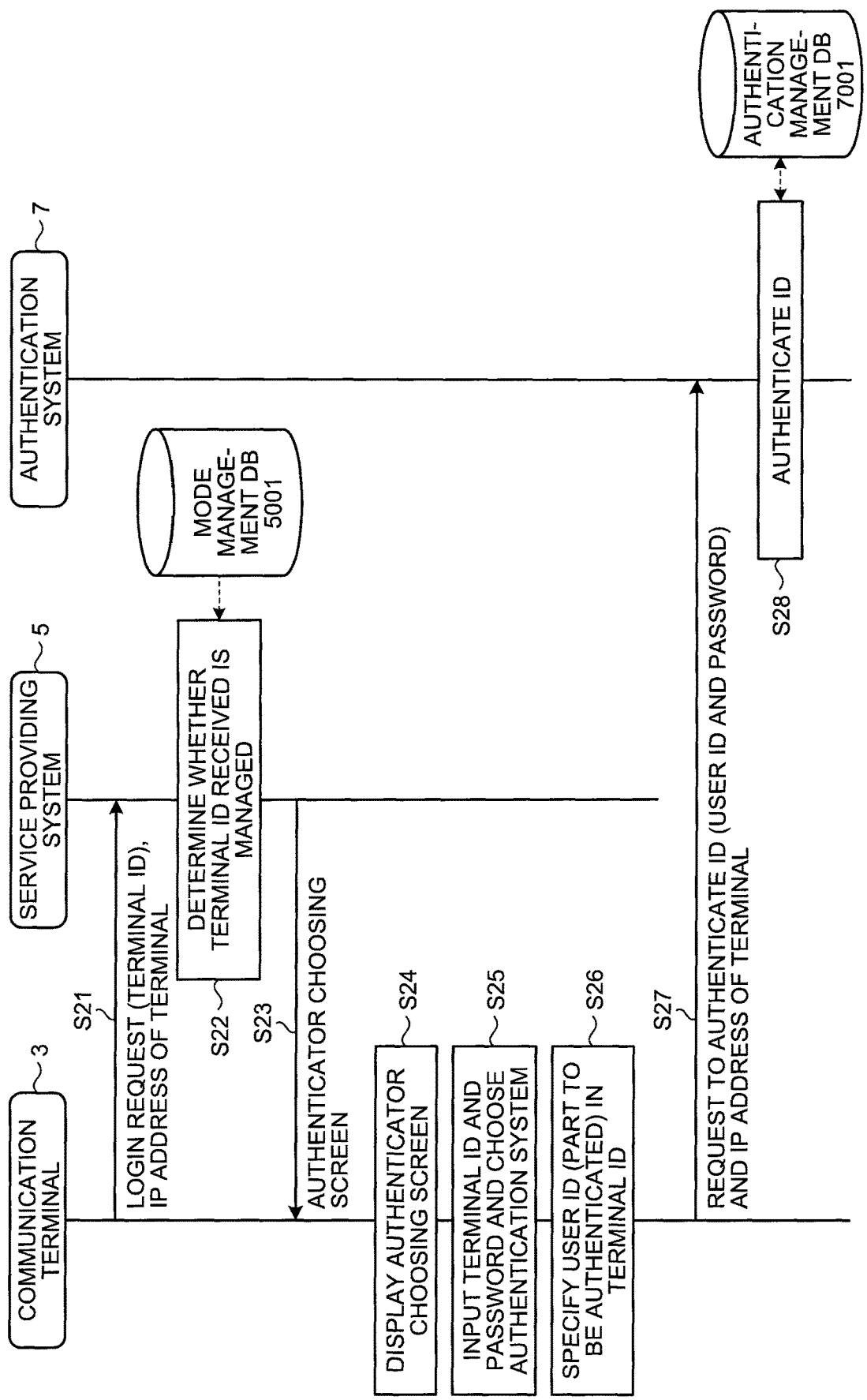

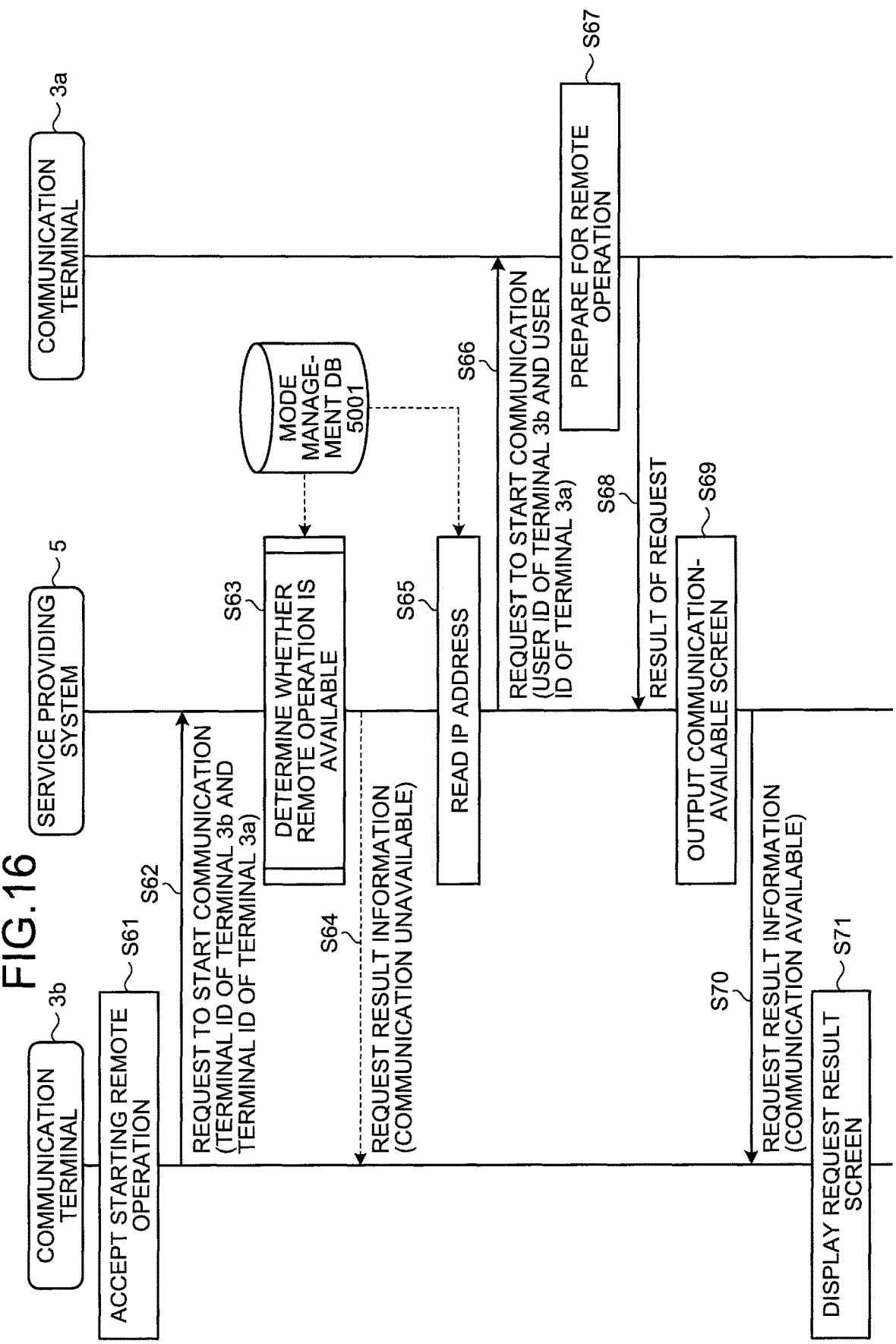

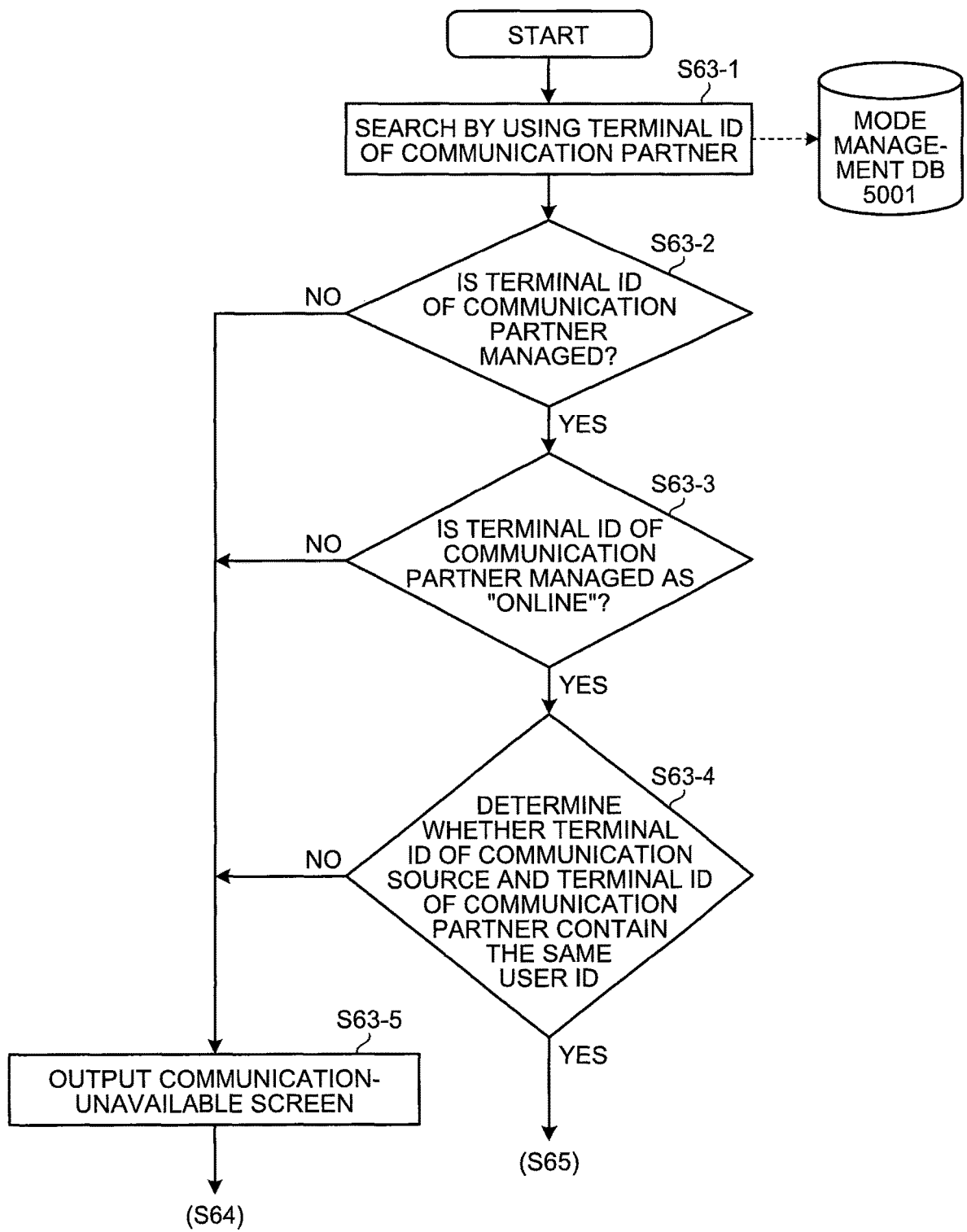

SERVICE PROVIDING APPARATUS CONFIGURED TO CONTROL COMMUNICATION MODE BETWEEN COMMUNICATION TERMINALS, SERVICE COMMUNICATING SYSTEM, SERVICE PROVIDING METHOD AND RECORDING MEDIUM CONFIGURED TO PERFORM SAME

CROSS-REFERENCE TO RELATED APPLICATIONS

This application is a national phase under 35 U.S.C. § 371 of PCT International Application No. PCT/JP2017/025077 which has an international filing date of Jul. 10, 2017, which claims priority to Japanese Application No. 2016-140782, filed Jul. 15, 2016, the entire contents of each of which are hereby incorporated by reference.

TECHNICAL FIELD

The present invention relates to a service providing system, a service communicating system, a service providing method and a computer-readable recording medium.

BACKGROUND ART

To receive provision of various services from a server via the Internet by using a communication terminal, a user previously registers terminal identification information (for example, a terminal ID (Identification)) that is used for login authentication and a password in the server.

Furthermore, when communication is performed among a multiple communication terminals by using the services, in order to prevent other users with whom a user does not intend to communicate from, for example, transmitting a request to start communication to arbitrarily participate in the communication, the user previously registers terminal identification information in an address list for managing the communication terminals that are able to start communication (refer to Japanese Laid-open Patent Publication No. 2015-201827).

SUMMARY OF INVENTION

Technical Problem

When a user causes his/her own multiple communication terminals to communicate with each other by using the services to, for example, cause a selected one of his/her own communication terminal to remotely operate another one of his/her own communication terminals, registration of terminal identification information in a server and registration of the terminal identification information in an address list are necessary with respect to each of the communication terminals. This causes a problem that an increase in the number of user's own communication terminals that receive the services increases the work of the user to register the terminal identification information in the server and register the terminal identification information in the address list.

Solution to Problem

According to an embodiment, there is provided a service providing system that provides a service to a communication terminal according to a request of the communication terminal, the service providing system comprising: a management unit configured to manage given terminal identification information for identifying a given communication terminal, the given terminal identification information containing user identification information that is used to authenticate a user of the given communication terminal, according to a login request from a communication terminal; a receiver configured to receive, from a first communication terminal that is identified by first terminal identification information, a request to start communication with a second terminal that is identified by second terminal identification information; and a transmitter configured to transmit, when the second terminal identification information being managed by the management unit contains the same user identification information as the user identification information contained in the first terminal identification information, a request to start communication with the first communication terminal to the second communication terminal in response to the receiving of the request to start communication, wherein when the second terminal identification information does not contain the same user identification information as the user identification information contained in the first terminal identification information, the transmitter does not transmit the request to start communication with the first communication terminal to the second communication terminal.

Advantageous Effects of Invention

As described above, the present invention achieves an effect that, even when the number of communication terminals that receive the services increases, it is possible to prevent an increase in the work of the user to register the terminal identification information in the server and register the terminal identification information in the address list.

BRIEF DESCRIPTION OF DRAWINGS

FIG. 8 is a schematic diagram illustrating a mode management table.

FIG. 10A is a schematic diagram illustrating an authentication management table that an authentication system has.

FIG. 10B is a schematic diagram illustrating an authentication management table that another authentication system has.

FIG. 10C is a schematic diagram illustrating an authentication management table that another authentication system has.

FIG. 11 is a sequence chart illustrating an authentication process.

FIG. 16 is a sequence chart illustrating a process of starting a remote operation.

FIG. 17 is a flowchart illustrating a process of determining whether a remote operation is available.

DESCRIPTION OF EMBODIMENTS

Exemplary embodiments of the present invention will be described with reference to the accompanying drawings.

Entire Configuration of Embodiment

Figure 1:
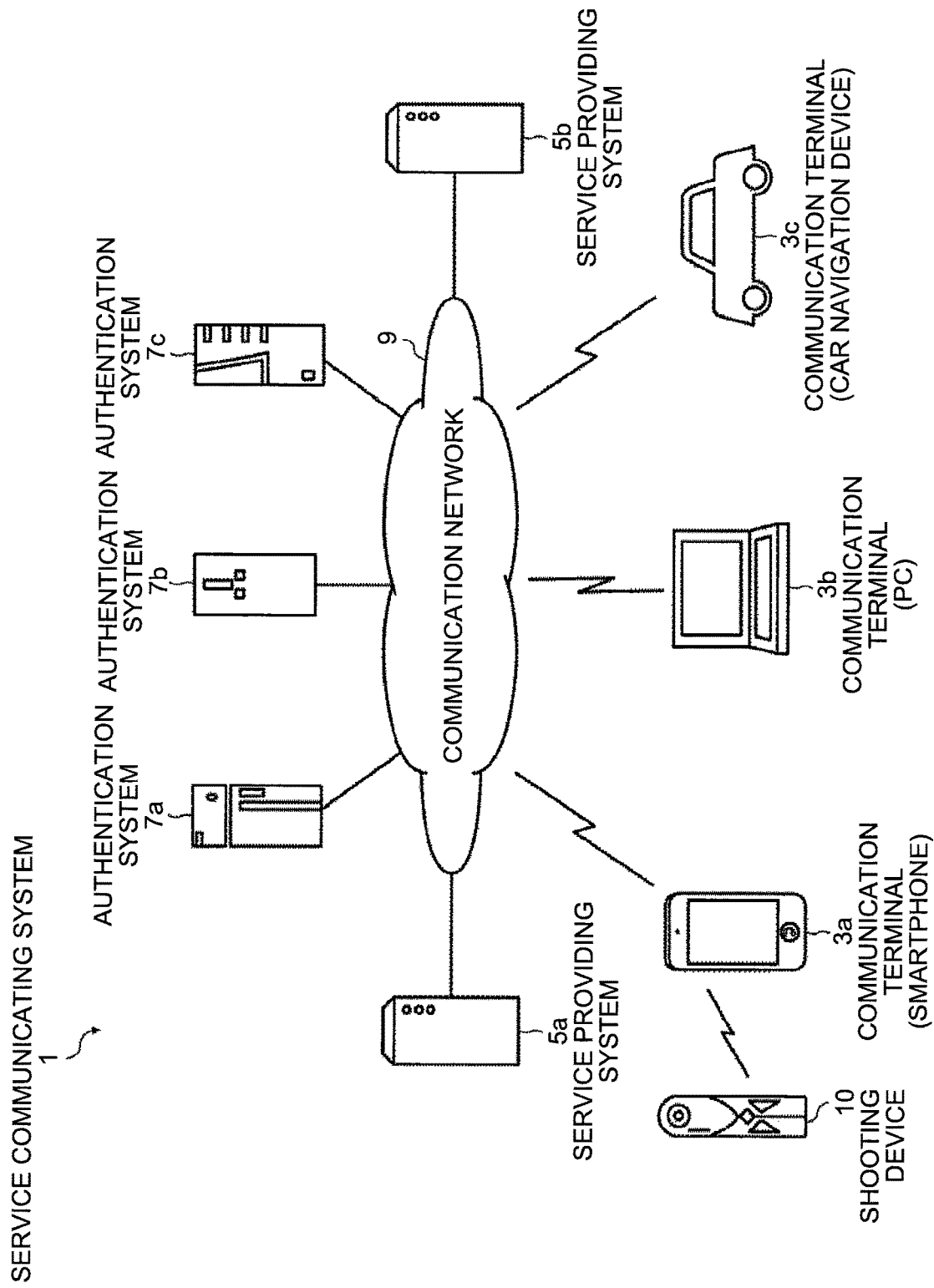
FIG. 1 is a diagram of an entire configuration of a service communicating system according to an embodiment.

FIG. 1 is a diagram of an entire configuration of a service communicating system according to an embodiment. As illustrated in FIG. 1, a service communicating system 1 is built up with a plurality of communication terminals (3a, 3b and 3c), a plurality of service providing systems (5a and 5b), a plurality of authentication systems (7a, 7b and 7c) and an shooting device 10 that are able to communicate with one another via a communication network 9, such as the Internet.

The shooting device 10 is, for example, a digital camera that generates an omnidirectional/panorama image by imaging, for example, scenery. The communication terminal 3a is, for example, a smartphone. The communication terminal 3a communicates with the shooting device 10 by using a short-distance radio technology, such as Bluetooth (trademark). For example, the communication terminal 3a transmits an instruction to start shooting to the shooting device 10 and accordingly the shooting device 10 is able to transmit various types of data obtained through shooting, such as image data and audio data, to the communication terminal 3a. The shooting device 10 is not able to use the communication network 9 independently and therefore transmits various types of data to the communication network 9 via the communication terminal 3a. The communication terminal 3b is, for example, a personal computer. The communication terminal 3c is, for example, a car navigation device.

For simple descriptions, FIG. 1 illustrates the three communication terminals (3a, 3b and 3c), the two service providing systems (5a and 5b), the three authentication systems (7a, 7b and 7c) and the single shooting device 10; however, the numbers of terminals and systems are not limited thereto. In the following descriptions, a selected one of the communication terminals (3a, 3b and 3c) will be referred to as a "communication terminal 3" and a selected one of the service providing systems (5a and 5b) will be referred to as a "service providing system 5". Furthermore, a selected one of the authentication systems (7a, 7b and 7c) will be referred to as an "authentication system 7".

The service providing system 5 and the authentication system 7 may be configured by using a single computer or may be configured by using multiple computers. The shooting device 10 may be a general digital camera that does not generate any omnidirectional/panorama image.

The communication terminal 3 is an exemplary mobile terminal, such as a smartphone, a personal computer or a car navigation device; however, the communication terminal 3 is not limited thereto. Not only a mobile terminal but also an information processing terminal, such as a desktop PC or a server, may serve as the communication terminal 3. Alternatively, the communication terminal 3 may be an office machine, such as a copier or a printer, a home electronic product, such as an air conditioner or a TV set, an electronic part, or a medical equipment, such as a MRI (Magnetic Resonance Imaging) or an endoscope.

Method of Using Shooting Device

With reference to FIGS. 2A, 2B, 2C, and FIG. 3, a method of using the shooting device 10 will be described.

Figure 2A:
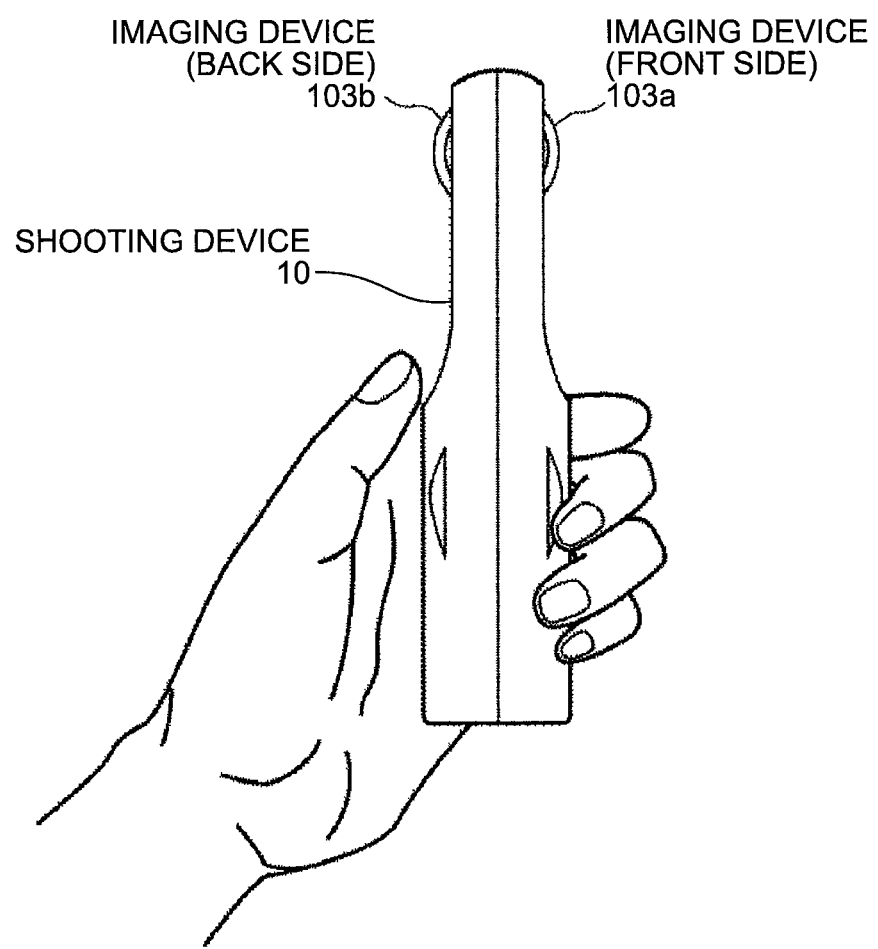
FIG. 2A is a diagram of a left side surface of a shooting device.
Figure 2B:
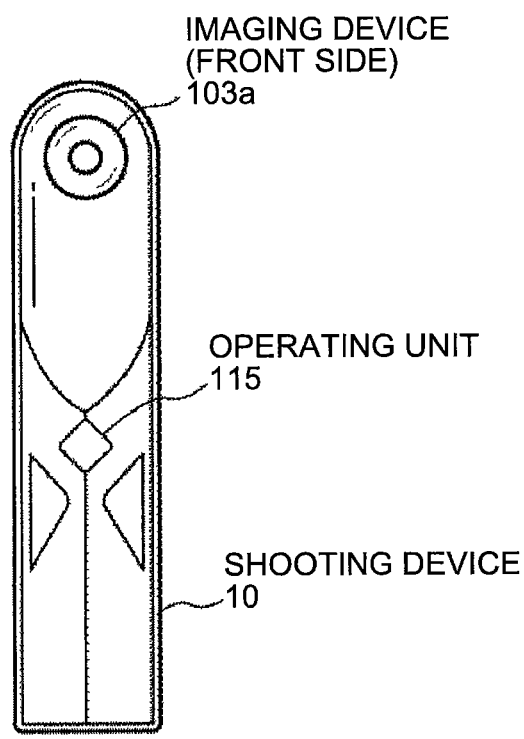
FIG. 2B is a front view of the shooting device.
Figure 2C:
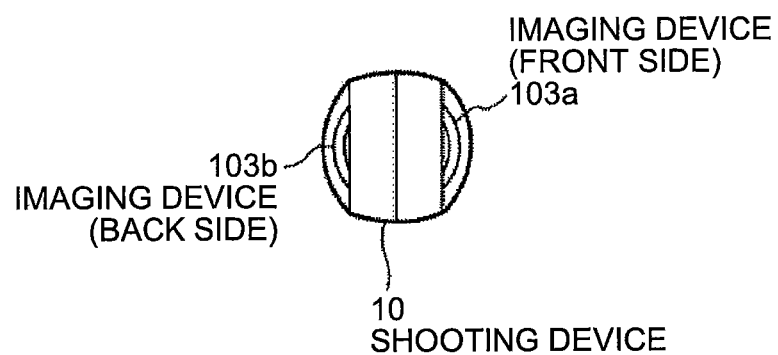
FIG. 2C is a plane view of the shooting device.

First of all, with reference to FIGS. 2A, 2B, and 2C, the external view of the shooting device 10 will be described. FIG. 2A is a diagram of a left side surface of the shooting device, FIG. 2B is a front view of the shooting device and FIG. 2C is a plane view of the shooting device. The shooting device 10 is a digital camera for acquiring a shot image from which an omnidirectional/panorama (360-degree) image originates.

As illustrated in FIG. 2A, the shooting device 10 is sized such that a person is able to hold the shooting device 10 with one hand. As illustrated in FIGS. 2A, 2B and 2C, an imaging device 103a is provided on the front side (anterior side) and an imaging device 103b is provided on the back side (posterior side) in a top part of the shooting device 10. As illustrated in FIG. 2B, an operation unit 115, such as a shutter button, is provided on the front side of the shooting device 10.

Figure 3:
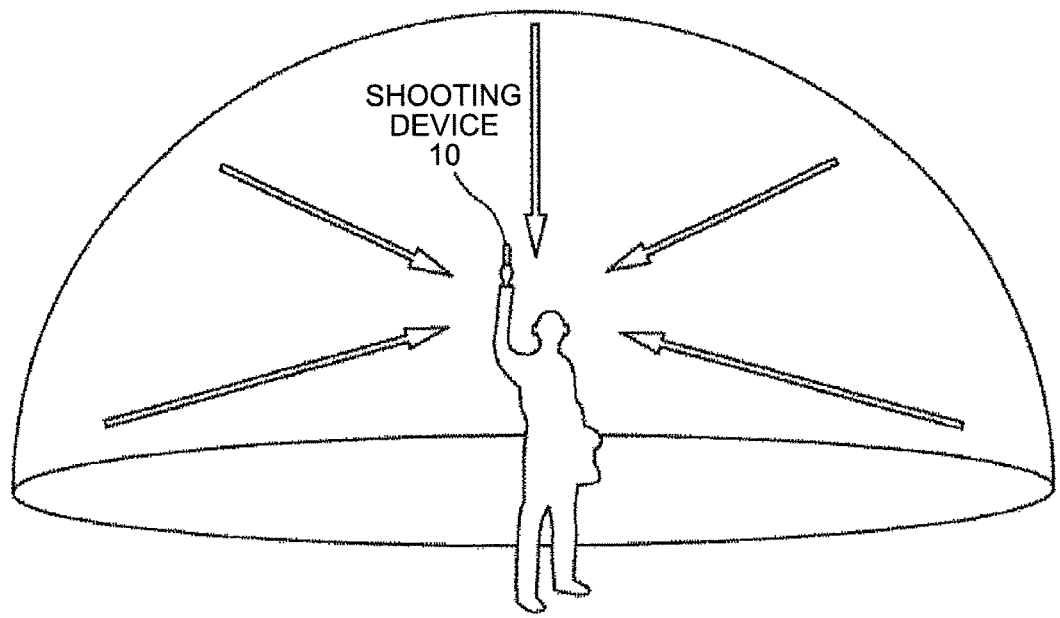
FIG. 3 is a diagram of an image illustrating the use of the shooting device.

With reference to FIG. 3, the use of the shooting device 10 will be described. FIG. 3 is a diagram of an image illustrating the use of the shooting device. As illustrated in FIG. 3, the shooting device 10 is held by a user in a hand and is used to image a subject or scenery around the user. In this case, the imaging device 103a and the imaging device 103b illustrated in FIGS. 2A, 2B, and 2C images the subject or scenery around the user, thereby acquiring two hemisphere images.

Hardware Configuration of Embodiment

Figure 4:
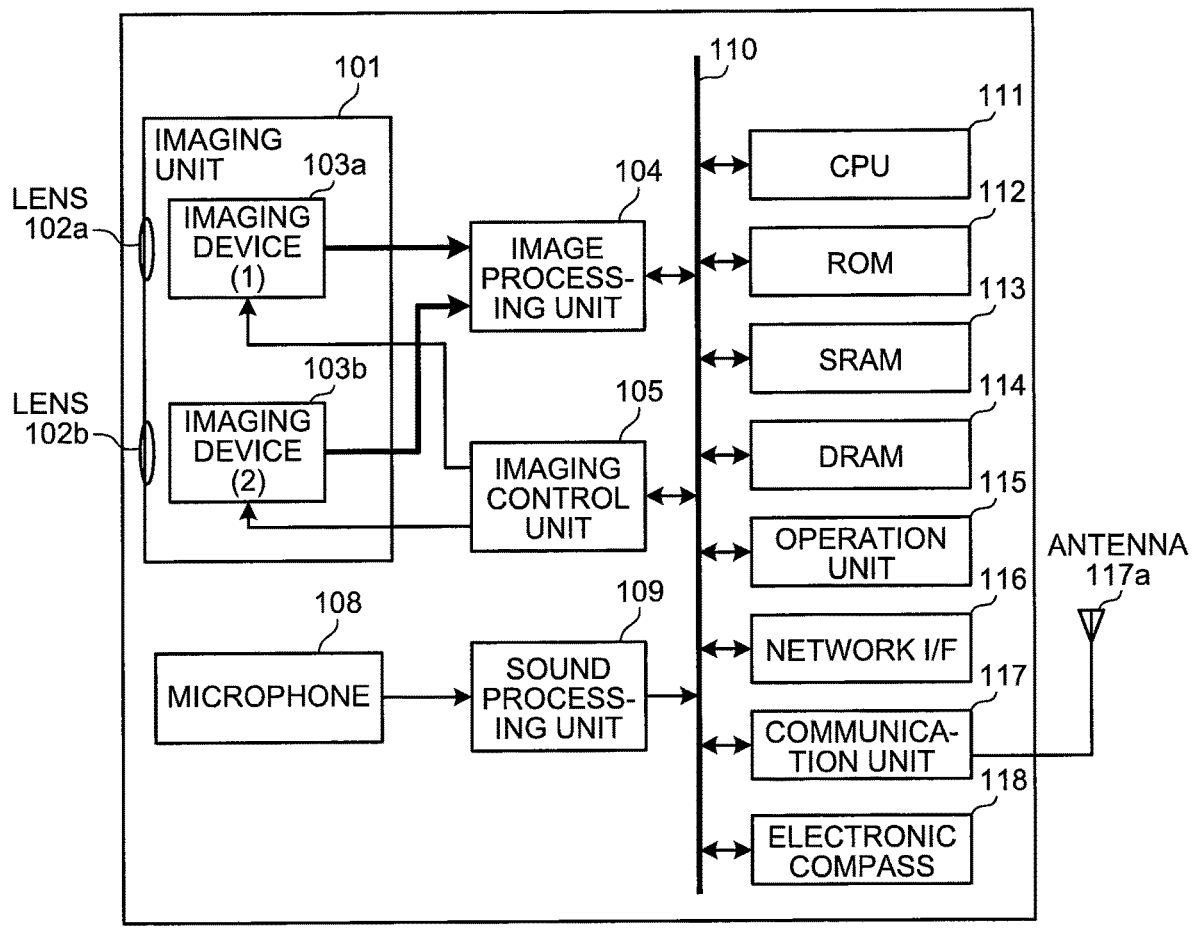
FIG. 4 is a diagram of a hardware configuration of the shooting device.
Figure 5:
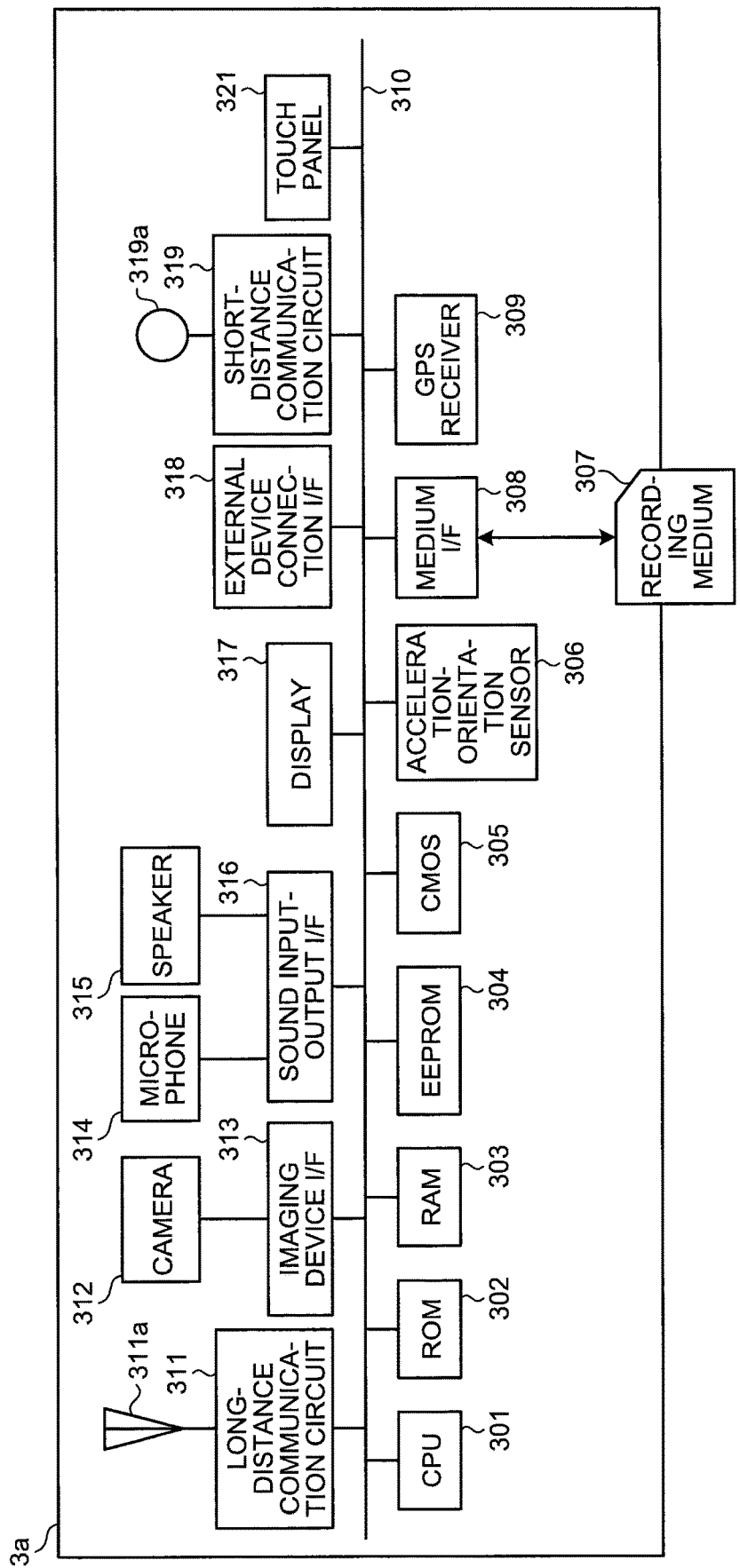
FIG. 5 is a diagram of a hardware configuration of communication terminals.
Figure 6:
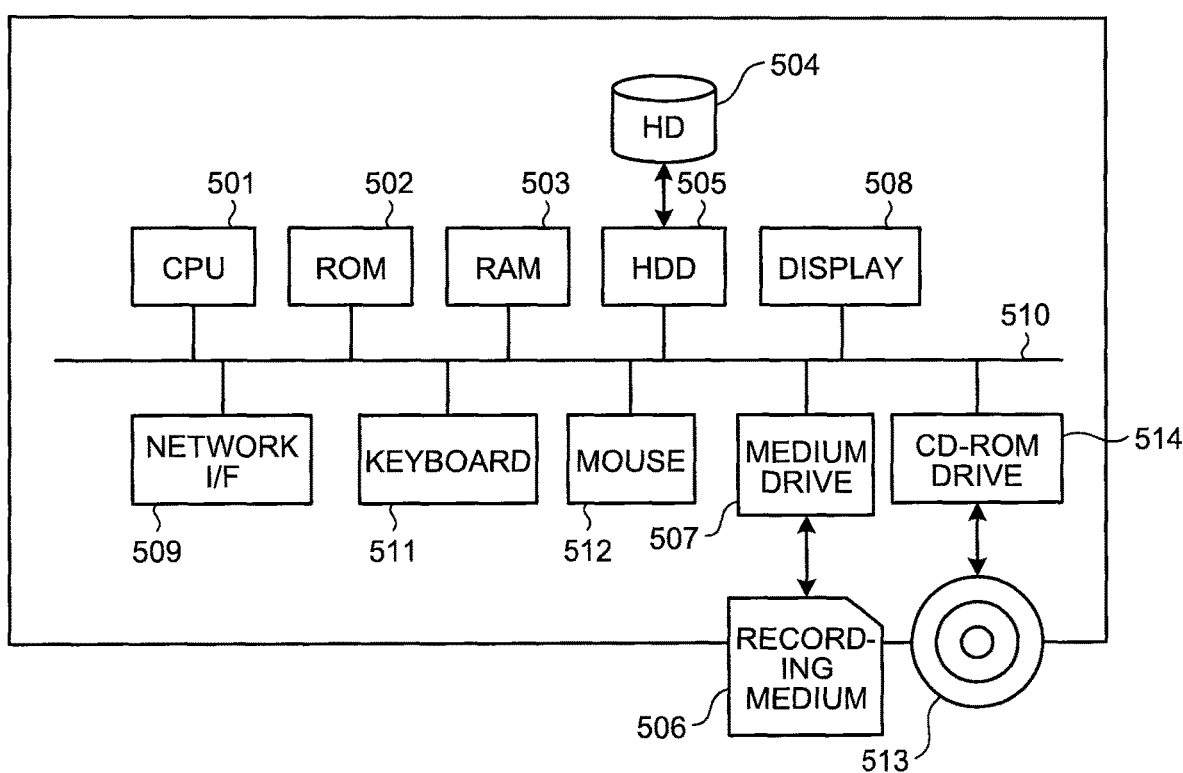
FIG. 6 is a diagram of a hardware configuration of service providing systems and authentication systems.

With reference to FIGS. 4 to 6, the hardware configuration of the shooting device 10, the communication terminal 3, and the service providing system 5 will be described in detail below.

Hardware Configuration of Shooting Device

First of all, with reference to FIG. 4, the hardware configuration of the shooting device 10 will be described.

FIG. 4 is a diagram of a hardware configuration of the shooting device 10. The shooting device 10 is an omnidirectional shooting device using the two imaging devices according to the following descriptions; however, three or more imaging devices may be used. Furthermore, the shooting device 10 is not necessarily a device dedicated to omnidirectional shooting. An optional omnidirectional shooting unit may be attached to, for example, a normal digital camera or a smartphone to substantially implement the same function as that of the shooting device 10.

As illustrated in FIG. 4, the shooting device 10 includes an imaging unit 101, an image processing unit 104, an imaging control unit 105, a microphone 108, a sound processing unit 109, a CPU (Central Processing Unit) 111, a ROM (Read Only Memory) 112, a SRAM (Static Random Access Memory) 113, a DRAM (Dynamic Random Access Memory) 114, the operation unit 115, a network I/F 116, a communication unit 117 and an antenna 117a.

The imaging unit 101 includes wide lenses (fisheye lens) 102a and 102b for forming hemisphere images, respectively, each having an angle of view of 180 degrees or more and the two imaging devices 103a and 103b that are provided in association with the respective wide lenses. Each of the imaging devices 103a and 103b includes an image sensor, such as a CMOS (Complementary Metal Oxide Semiconductor) sensor or a CCD (Charge Coupled Device) sensor, that converts an optical image obtained by using the fisheye lens into image data of electronic signals and outputs the image data; a timing generating circuit that generates horizontal or vertical synchronization signals and pixel clocks of the image sensor; and a group of registers in which various commands and parameters necessary for operations of the imaging device are set.

The imaging devices 103a and 103b of the imaging unit 101 are connected to the image processing unit 104 via a parallel I/F bus. On the other hand, the imaging devices 103a and 103b of the imaging unit 101 are further connected to the imaging control unit 105 via a serial I/F bus (such as an I2C bus). The image processing unit 104 and the imaging control unit 105 are connected to the CPU 111 via a bus 110. Furthermore, the ROM 112, the SRAM 113, the DRAM 114, the operation unit 115, the network I/F 116, the communication unit 117, and an electronic compass 118, etc., are connected to the bus 110.

The image processing unit 104 loads the image data that is output from the imaging devices 103a and 103b via the parallel I/F bus and performs given processing on the respective sets of image data and then performs synthesizing processing on the sets of image data to create data of a Mercator image.

The imaging control unit 105 generally uses the imaging control unit 105 as a master device and uses the imaging devices 103a and 103b as slave devices and sets, for example, commands in a group of registers of the imaging devices 103a and 103b by using the I2C bus. The imaging control unit 105 receives necessary commands, etc., from the CPU 111. The imaging control unit 105 loads status data, etc., of the group of registers of the imaging devices 103a and 103b also by using the I2C bus and transmits the status data etc., to the CPU 111.

The imaging control unit 105 instructs the imaging devices 103a and 103b to output image data at the timing when the shutter button of the operation unit 115 is pressed. Depending on a shooting device to be used as the shooting device, the shooting device may have a preview display function or a function corresponding to video image display implemented by the display. In this case, image data is output from the imaging devices 103a and 103b at a given frame rate (frame/second) sequentially.

As described below, the imaging control unit 105 also functions as a synchronization control unit that synchronizes the timings at which sets of image data are output from the imaging devices 103a and 103b in cooperation with the CPU 111. No display unit is provided to the shooting device 10 according to the embodiment; however, a display unit may be provided.

The microphone 108 converts sound into sound (signal) data. The sound processing unit 109 loads sound data that is output from the microphone 108 via the I/F bus and performs given processing on the sound data.

The CPU 111 controls entire operations of the shooting device 10 and executes necessary processes. The ROM 112 stores various programs for the CPU 111. The SRAM 113 and the DRAM 114 are work memories that store programs executed by the CPU 111 and data in processing. Particularly, the DRAM 114 stores the data that is being processed by the image processing unit 104 and data of the processed Mercator image.

The operating unit 115 is a collective name of various operation buttons, a power switch, the shutter button, and a touch panel having both display and operation functions. The user operates the operation buttons to input various shooting modes and shooting conditions.

The network I/F 116 is a collective name of interface circuits (such as a USB I/F) interfacing with for example, an external medium, such as an SD card and a personal computer. The network I/F 116 may be a network interface regardless whether it is wired or wireless. The Mercator image data stored in the DRAM 114 is recorded in an external medium via the network/F 116 or, when needed, is transmitted to an external device, such as the communication terminal 3, via the network I/F 116 serving as a network I/F.

The communication unit 117 communicates with an external device, such as the communication terminal 3a, by using a short-distance wireless technology, such as WiFi (wireless fidelity) or NFC, via the antenna 117a that is provided to the shooting device 10. It is possible to transmit the Mercator image data also by using the communication unit 117 to an external device, such as the communication terminal 3a.

The electronic compass 118 calculates the orientation and obliqueness (roll angle) of the shooting device 10 from the magnetism of the earth and outputs orientation-obliqueness information. The orientation-obliqueness information is exemplary relative information (meta data) according to Exif and is used for image processing, such as image correction on the shot image. The relative information contains each type of data, such as the shooting date and data volume of image data.

Hardware Configuration of Smartphone FIG. 5 is a diagram of a hardware configuration of a smartphone. As illustrated in FIG. 5, the communication terminal 3a serving as a smartphone includes a CPU 301, a ROM 302, a RAM 303, an EEPROM 304, a CMOS sensor 305, an acceleration-orientation sensor 306, a medium I/F 308 and a GPS receiver 309.

The CPU 301 among them controls entire operations of the smartphone. The ROM 302 stores a program that is used to drive the CPU 301 or an IPL. The RAM 303 is used as a work area of the CPU 301. Various types of data, such as a smartphone program, are read from or written in the EEPROM 304 under the control of the CPU 301. The CMOS sensor 305 images a subject under the control of the CPU 301 and thus acquires image data. The acceleration-orientation sensor 306 includes various sensors, such as an electronic magnetic compass or a gyro compass that detects geomagnetism and an acceleration sensor. The medium I/F 308 controls the reading or writing (storing) of data from and in a recording medium 307, such as a flash memory. The GPS receiver 309 receives GPS signals from a GPS satellite.

The smartphone further includes a long-distance communication circuit 311, an antenna 311a of the long-distance communication circuit 311, a camera 312, an imaging device I/F 313, a microphone 314, a speaker 315, a sound input-output I/F 316, a display 317, an external device connection I/F 318, a short-distance communication circuit 319, an antenna 319a of the short-distance communication circuit 319, and a touch panel 321.

The long-distance communication circuit 311 among them is a circuit that communicates with other devices via the antenna 311a and the communication network 9. The camera 312 is a type of built-in imaging unit that acquires image data by imaging a subject under the control of the CPU 301. The imaging device I/F 313 is a circuit that controls driving of the camera 312. The microphone 314 is a type of built-in sound collector to which sound is input. The sound input-output I/F 316 is a circuit that processes input and output of sound signals between the microphone 314 and the speaker 315 under the control of the CPU 301. The display 317 is a type of display unit that displays the image of the subject and various icons, such as a liquid crystal display or organic EL display. The external device connection I/F 318 is an interface for connecting various external devices. The short-distance communication circuit 319 is a communication circuit, such as the NFC or Bluetooth. The touch panel 321 is a type of input unit that operates the smartphone when the user presses the display 317.

The smartphone includes a bus line 310. The bus line 310 includes an address bus and a data bus for electrically connecting the components including the CPU 301 illustrated in FIG. 5.

Each Hardware Configuration of PC, Car Navigation Device, Service Providing System and Authentication System With reference to FIG. 6, each hardware configuration of each of a PC, a car navigation device, a service providing system and an authentication system will be described. FIG. 6 is a diagram of each hardware configuration of the PC, the car navigation device, the service providing system and the authentication system. The PC, the car navigation device, the service providing system and the authentication system are computers and therefore the configuration of the service providing system 5 will be described and descriptions of other configurations will be omitted.

The service providing system 5 includes a CPU 501 that controls entire operations of the service providing system 5; a ROM 502 that stores a program used to drive the CPU 501, such as an IPL; a RAM 503 that is used as a work area of the CPU 501; an HD 504 that stores various types of data, such as a program for the service providing system 5; an HDD (Hard Disk Drive) 505 that controls reading or writing various types of data from or in the HD 504; a medium drive 507 that controls reading or writing data from or in a recording medium 506, such as a flash memory; a display 508 that displays various types of information, such a cursor, a menu, a window, texts and an image; a network I/F 509 for communicating data by using the communication network 9; a keyboard 511 including multiple keys for inputting texts, numeric values and various instructions; a mouse 512 that chooses and executes various instructions, selects a subject to be processed, and moves the cursor; a CD-ROM drive 514 that controls reading or writing various types of data from or in a CD-ROM (Compact Disc Read Only Memory) 513 serving as an exemplary removable recording medium; and a bus line 510 including an address bus and a data bus for electrically connecting the components listed above as illustrated in FIG. 6.

It is possible to provide domestically or overseas a recording medium, such as a CD-ROM, in which each program is stored according to the embodiment as a program product.

Functional Configuration of Embodiment

Figure 7:
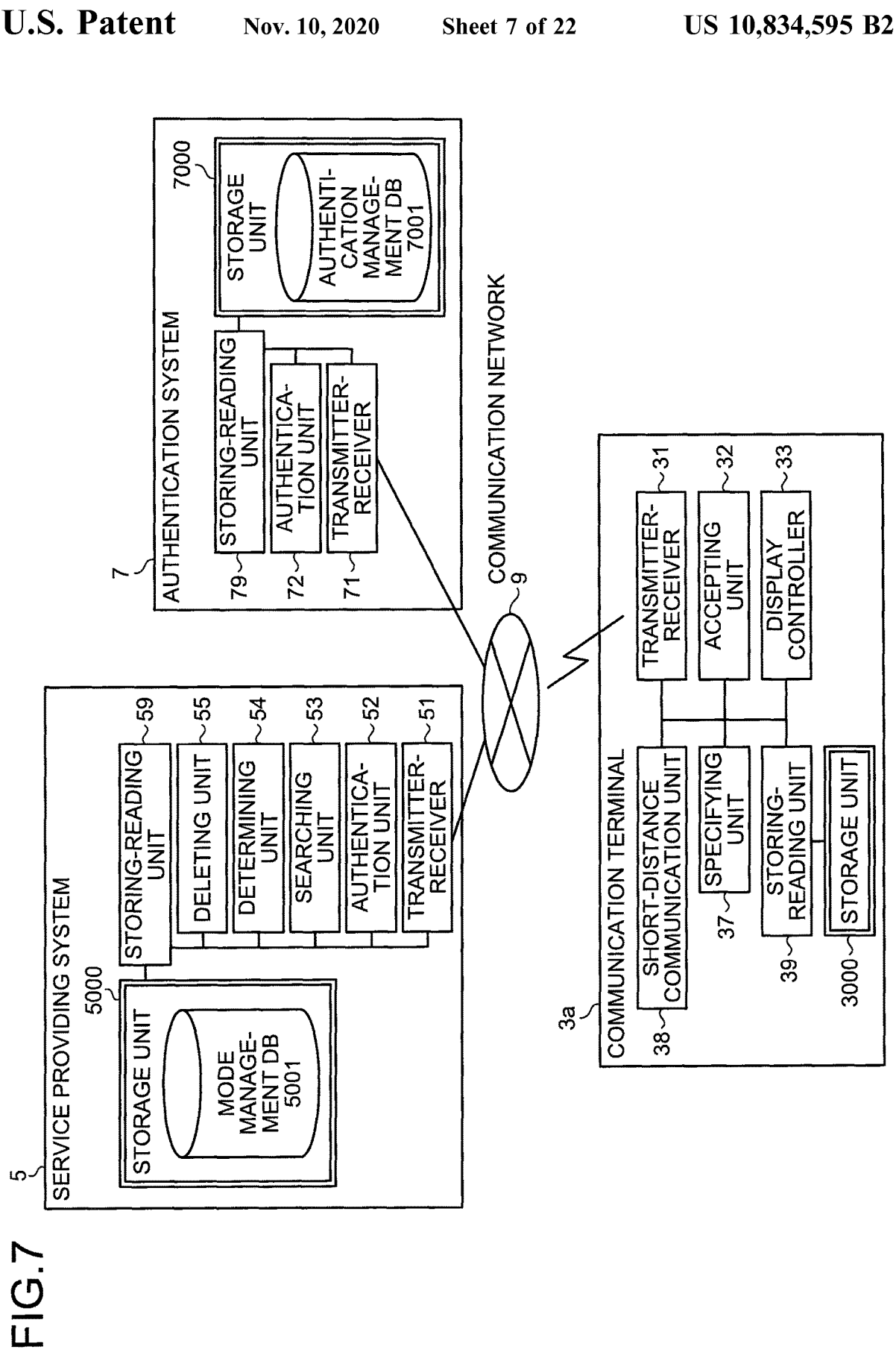
FIG. 7 is a diagram of the service communicating system that includes each block diagram of each function of the service communicating system.

A functional Configuration of the embodiment will be described. FIG. 7 is a diagram of functional blocks of a service communicating system. It is possible to implement each function illustrated below by using one or more processing circuits. The "processing circuits" include a processor programmed to execute each function by using software as in a processor that is implemented with an electronic circuit, an ASIC (Application Specific Integrated Circuit), a DSP (digital signal processor), a FPGA (field programmable gate array), and a conventional circuit module.

Functional Configuration of Communication Terminal

FIG. 7 illustrates a functional configuration of the communication terminal 3a as an example of the communication terminal 3. As illustrated in FIG. 7, the communication terminal 3a includes a transmitter-receiver 31, an accepting unit 32, a display controller 33, a specifying unit 37, a short-distance communication unit 38, and a storing-reading unit 39. Each of the units is a function or a unit that is implemented by causing any one of the components illustrated in FIG. 5 to operate according to a command from the CPU 301 according to the program for the communication terminal 3a that is loaded into the RAM 303 from the EPPROM 304.

The communication terminal 3a includes a storage unit 3000 that is built up with the ROM 302, the RAM 303 and the EEPROM 304 illustrated in FIG. 5.

Configuration of Each Function of Communication Terminal 3a

With reference to FIG. 7, each configuration of each function of the communication terminal 3a will be described further in detail.

The transmitter-receiver 31 of the communication terminal 3a is implemented mainly according to a command from the CPU 301 illustrated in FIG. 5 and by the long-distance communication circuit 311, and transmits and receives various types of data (or information) to and from the service providing system 5 and the authentication system 7 via the communication network 9.

The accepting unit 32 is implemented mainly according to a command from the CPU 301 illustrated in FIG. 5 and by the touch panel 321. The accepting unit 32 accepts an operation of the user.

The display controller 33 is implemented mainly according to a command from the CPU 301 illustrated in FIG. 5. The display controller 33 causes the display 317 to display a given screen. In the case of the communication terminal 3a, an OpenGL ES (Open Graphics Library for Embedded Systems) is used and thus the display controller 33 attaches the Mercator image data transmitted from the shooting device 10 in a way that the data covers the sphere to create an omnidirectional/panorama image.

The specifying unit 37 is implemented mainly according to a command from the CPU 301 illustrated in FIG. 5, and the specifying unit 37 specifies a user ID (part to be authenticated) among a code forming a terminal ID. The terminal ID according to the embodiment is exemplary terminal identification information. The terminal identification information contains not only the terminal ID but also a product number of the terminal, etc. The user ID according to the embodiment is exemplary user identification information. The user identification information contains not only the user ID but also the name of the user and my number based on the Japanese national identification number.

The short-distance communication unit 38 performs communication according to a command from the CPU 301 illustrated in FIG. 5 and by using the short-distance communication circuit 319.

The storing-reading unit 39 is implemented mainly according to the process performed by the CPU 301 illustrated in FIG. 5. The storing-reading unit 39 stores various types of data (or information) in the storage unit 3000 and reads various types of data (or information) from the storage unit 3000.

Functional Configuration of Service Providing System With reference to FIG. 6 and FIGS. 7 to 9C, each configuration of each function of the service providing system 5 will be described in detail. As illustrated in FIG. 7, the service providing system 5 includes a transmitter-receiver 51, an authentication unit 52, a searching unit 53, a determining unit 54, a deleting unit 55, and a storing-reading unit 59. Each of the units is a function or a procedure that is implemented by causing any one of the components illustrated in FIG. 6 to operate according to a command, the command being issued from the CPU 501 according to the program for the service providing system 5 that is loaded into the RAM 503 from the HD 504.

The service providing system 5 includes a storage unit 5000 that is built up with the RAM 503 and the HD 504 illustrated in FIG. 6. The storage unit 5000 stores various types of data transmitted from the communication terminal 3 or the authentication system 7.

Furthermore, in the storage unit 5000, a mode management DB 5001 is built. The mode management DB 5001 includes the mode management table to be described below. The mode management table will be described in detail below.

Mode Management Table FIG. 8 is a schematic view illustrating the mode management table. In the mode management table, a terminal ID for identifying the communication terminal 3, communication mode information representing the communication mode of the communication terminal 3, and an IP address of the communication terminal 3 are associated with one another and managed. The communication mode includes an on-line mode and an off-line mode. Furthermore, the turn to be online is added to the offline mode. For example, in FIG. 8, "offline (1)" represents the possibility of being online first and "offline (2)" represents the possibility of being online second. The IP address in FIG. 8 represents the simplified mode of IPv4. The IP address may be IPv6.

The service providing system 5 adds a new record containing a terminal ID of a communication terminal representing a source of request to the mode management table when receiving a login request from the communication terminal 3, while the service providing system 5 deletes the record containing the terminal ID of the communication terminal representing a source of request from the mode management table when receiving a logout request from the communication terminal 3.

Figure 9A:
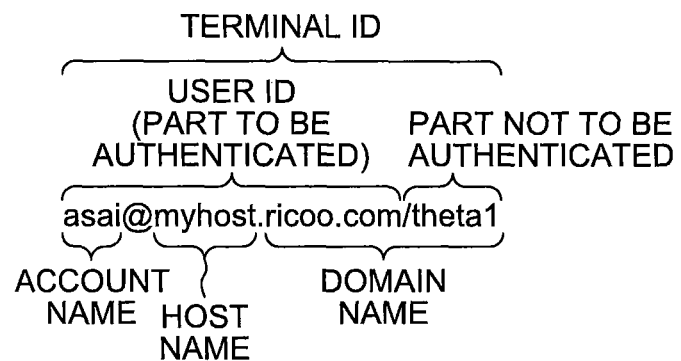
FIG. 9A is a diagram illustrating configuration pattern of terminal ID.
Figure 9B:
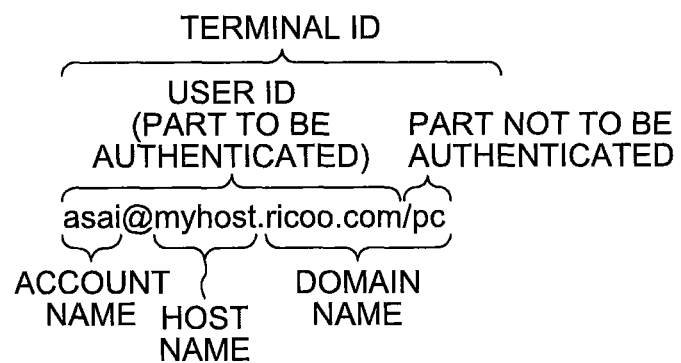
FIG. 9B is a diagram illustrating another configuration patter of the terminal ID.
Figure 9C:
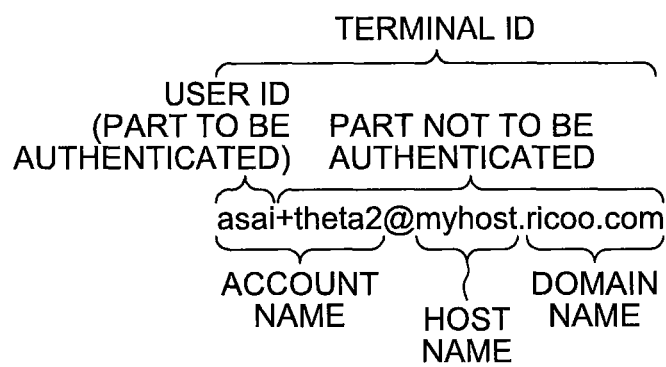
FIG. 9C is a diagram illustrating another configuration pattern of the terminal ID.

FIGS. 9A, 9B and 9C represent electronic mail addresses as exemplary terminal IDs each of which consists of a part to be authenticated and a part not to be authenticated. The part to be authenticated is a part used as a user ID by the authentication system 7 to authenticate the user. The part not to be authenticated is a part not used by the authentication system 7 to authenticate the user.

FIG. 9A illustrates a first pattern of terminal ID. The part to be authenticated in the first pattern consists of the account name "asai", the host name "myhost", and a former part "ricoo.com" of a domain name. On the other hand, the part not to be authenticated consists of a latter part "theta1" of the domain name. In this case, the specifying unit 37 to be described below distinguishes the part to be authenticated and the part not to be authenticated from each other by "/".

FIG. 9B illustrates the first pattern where the part to be authenticated is different from that in FIG. 9A. In other words, the terminal ID illustrated in FIG. 9A and the terminal ID illustrated in 9B have the same part to be authenticated and therefore the IDs are regarded as the same ID and authentication is performed.

FIG. 9C illustrates a second pattern of terminal ID. The part to be authenticated in the second pattern consists of a former part "asai" representing the account name. On the other hand, the part not to be authenticated consists of a latter part "theta2" in the account name, a host name "myhost", and a domain name "ricoo.com". In this case, the specifying unit 37 to be described below distinguishes between the part to be authenticated and the part not to be authenticated by using "+".

Configuration of each Function of Service Providing System With reference to FIG. 7, each configuration of each function of the service providing system 5 will be described in detail below.

The transmitter-receiver 51 of the service providing system 5 is implemented mainly according to a command from the CPU 501 illustrated in FIG. 6 and by the network I/F 509. The transmitter-receiver 51 transmits and receives various types of data (or information) to and from the communication terminal 3 or the authentication system 7 via the communication network 9.

The authentication unit 52 is implemented mainly according to a command from the CPU 501 illustrated in FIG. 6 and, for example, decrypts an encrypted token and authenticates the decrypted token.

The searching unit 53 is implemented mainly according to a command from the CPU 501 illustrated in FIG. 6. For example, the searching unit 53 searches the mode management table for the number of sets of communication mode information that are associated with a second terminal ID containing the same user ID as the user ID contained in a first terminal ID and that represent the online mode.

The determining unit 54 is implemented mainly according to a command from the CPU 501 illustrated in FIG. 6. For example, the determining unit 54 determines whether the number of sets of communication mode information representing the online mode, which is searched for by the searching unit 53, is smaller than a given number. The given number is, for example, 10. In this case, the same user is able to cause up to ten his/her own communication terminals to communicate to one another.

The deleting unit 55 is implemented mainly according to a command from the CPU 501 illustrated in FIG. 6. For example, according to reception of a logout request from the communication terminal 3 that is a specific communication terminal, the deleting unit 55 deletes a record containing a specific terminal ID for identifying the specific communication terminal 3 in the mode management table. For example, according to reception of a logout request from the specific communication terminal 3, the deleting unit 55 deletes a record where the specific terminal ID for identifying the specific communication terminal 3 is managed as a communication terminal that is the source of communication in the communication partner management table.

The storing-reading unit 59 is implemented mainly according to a command from the CPU 501 illustrated in FIG. 6. The storing-reading unit 59 stores various types of data in the storage unit 5000 and reads the various types of data from the storage unit 5000.

Functional Configuration of Authentication System 7

With reference to FIGS. 7 and 10, the functional configuration of the authentication system 7 will be described in detail. The authentication system 7 includes a transmitter-receiver 71, an authentication unit 72, and a storing-reading unit 79. Each of the units is a function or a procedure that is implemented by causing any one of the components illustrated in FIG. 6 to operate according to a command, the command being issued from the CPU 501 according to the program for the authentication system 7 that is loaded into the RAM 503 from the HD 504.

The authentication system 7 includes a storage unit 7000 that is built up with the RAM 503 and the HD 504 that are illustrated in FIG. 6. The storage unit 7000 stores various types of data transmitted from the communication terminal 3 or the service providing system 5.

Furthermore, an authentication management DB 7001 is built in the storage unit 7000. The authentication management DB 7001 includes an authentication management table to be described below. The table will be described in detail below.

Authentication management table FIG. 10A is a schematic diagram illustrating an authentication management table that the authentication system 7a has, FIG. 10B is a schematic diagram illustrating an authentication management table that the authentication system 7b has, and FIG. 10C is a schematic diagram illustrating an authentication management table that the authentication system 7c has.

Each of the authentication management tables stores and manages a user ID (a part to be authenticated) in a terminal ID and a password in association with each other.

Configuration of Each Function of Authentication System 7

With reference to FIG. 7, each configuration of each function of the authentication system 7 will be described in detail below.

The transmitter-receiver 71 of the authentication system 7 is implemented mainly according to a command issued from the CPU 501 illustrated in FIG. 6 and by the network I/F 509. The transmitter-receiver 71 transmits and receives various types of data (or information) to and from the communication terminal 3 and the service providing system 5 via the communication network 9.

The authentication unit 72 is implemented mainly according to a command issued from the CPU 501 illustrated in FIG. 6. The authentication unit 72 authenticates an ID by determining whether a communication terminal that transmits an authentication request has valid authority to receive the services.

The storing-reading unit 79 is implemented mainly according to a command issued from the CPU 501 illustrated in FIG. 6. The storing-reading unit 79 stores various types of data (or information) in the storage unit 7000 and reads various types of data (or information) from the storage unit 7000.

Process or Operations According to Embodiment

Figure 12:
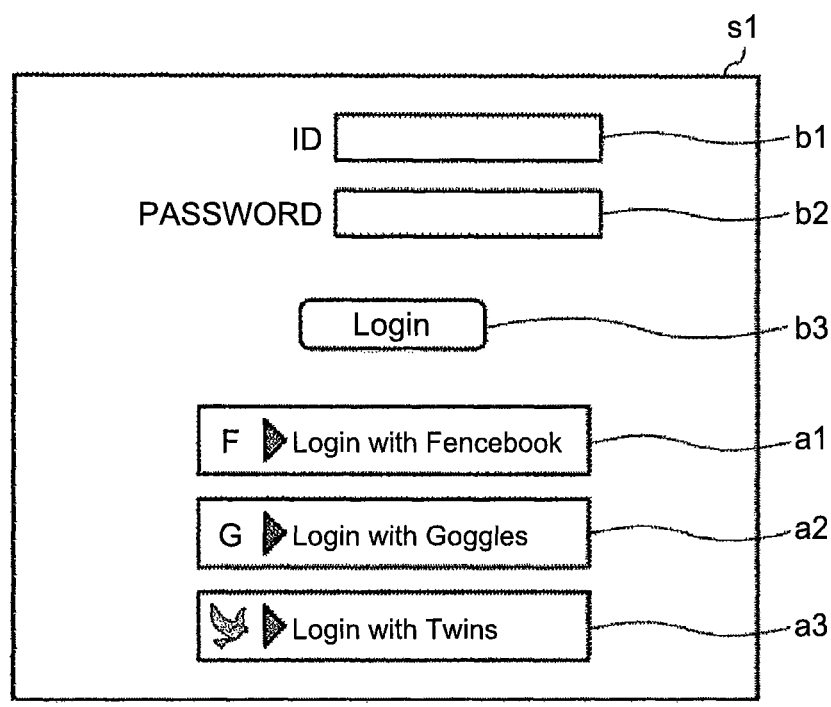
FIG. 12 illustrates an exemplary display of an authenticator choosing screen.
Figure 13:
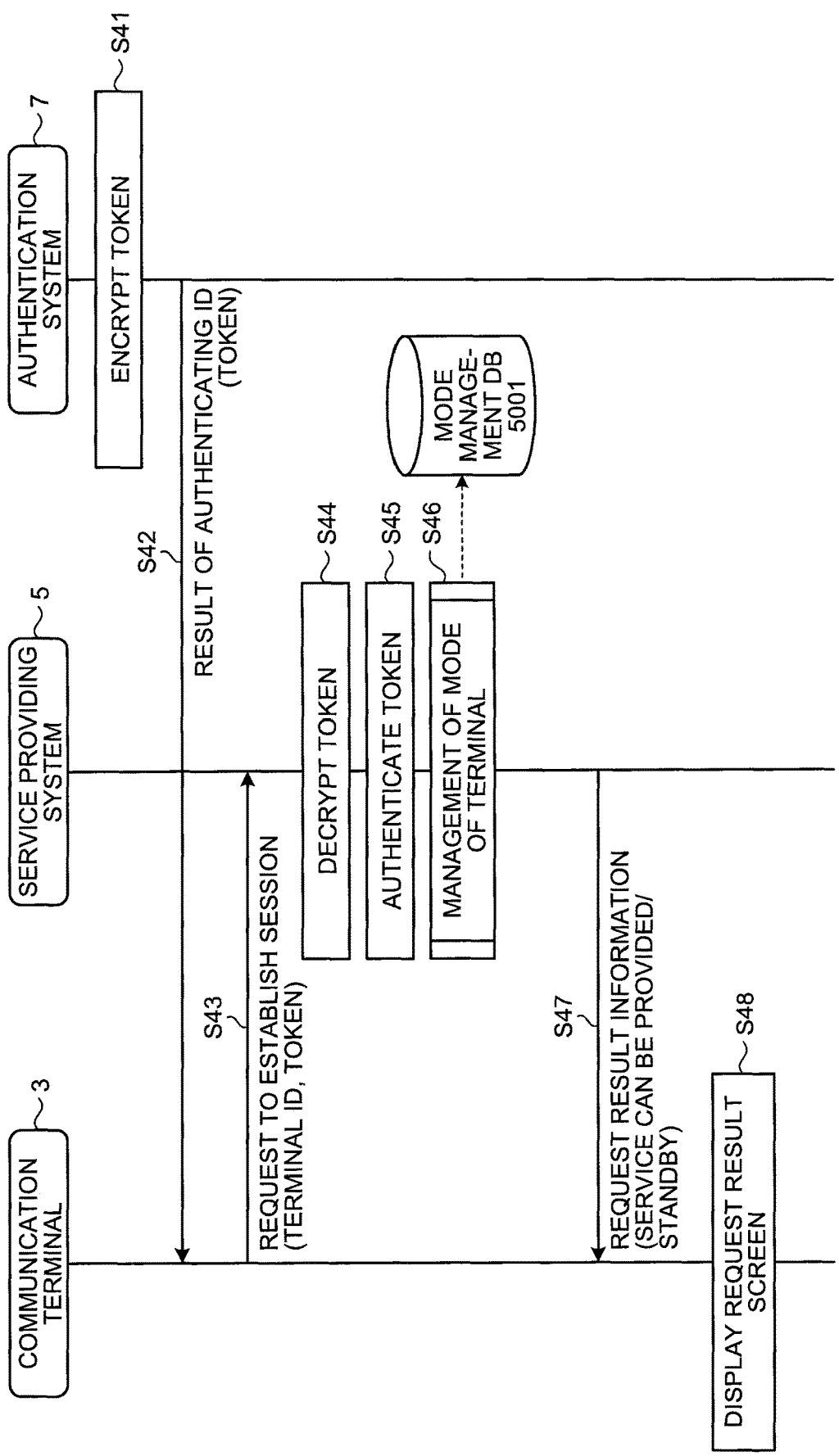
FIG. 13 is a sequence chart illustrating the authentication process.

With reference to FIGS. 11 to 20, a process or operations according to the embodiment will be described. FIGS. 11 and 13 are sequence charts illustrating an authentication process. FIG. 12 illustrates an exemplary display of an authenticator choosing screen.

As illustrated in FIG. 11, the transmitter-receiver 31 of the communication terminal 3 transmits a login request to the service providing system 5 (step S21). The request contains the terminal ID of the communication terminal 3. At that time, the transmitter-receiver 31 transmits the IP address of the communication terminal 3. Accordingly, the transmitter-receiver 51 of the service providing system 5 receives the login request and the IP address of the communication terminal 3.

The determining unit 54 of the service providing system 5 determines whether the terminal ID received at step S21 is managed in the mode management table (step S22). The case where the terminal ID is not managed will be described below.

The transmitter-receiver 51 of the service providing system 5 transmits data of the authenticator choosing screen to the communication terminal 3 (step S23). Accordingly, the transmitter-receiver 31 of the communication terminal 3 receives the data of the authenticator choosing screen.

The display controller 33 of the communication terminal 3 causes the display 317 to display an authenticator choosing screen s1 illustrated in FIG. 12 (step S24). FIG. 12 illustrates an exemplary PC screen serving as the communication terminal 3b. On the authenticator choosing screen s1, a terminal ID input filed b1, a password input field b2, and a login button b3 for a login request (authentication request) are displayed. Furthermore, on the authenticator choosing screen s1, authentication system choosing buttons a1, a2, and a3 for choosing the authentication systems 7a, 7b, and 7c are displayed. When the user inputs his/her terminal ID in the input field b1, inputs his/her own password in the input filed b2, presses a desired one of the authentication system choosing buttons a1, a2, and a3, and presses the login button b3, the accepting unit 32 accepts each input and choice (step S25). Note that the authentication system choosing buttons a1, a2 and a3 are previously associated with the URL of each authentication system 7.

The specifying unit 37 specifies the user ID (part to be authenticated) in the code of the terminal ID that is accepted by the accepting unit 32 (step S26). At that time, the specifying unit 37 specifies the user ID according to predetermined rules (step S26). For example, in the case where the terminal ID is as illustrated in FIG. 9A or 9B, the part before "/" after "com" is recognized as the user ID.

The transmitter-receiver 31 then transmits a request to authenticate the ID (herein, user ID) to the authentication system 7 according to the URL of the authentication system 7 according to the choosing button that is accepted by the accepting unit 32 (step S27). The authentication request contains the user ID that is specified at step S26 and the password that is accepted at step S25. At that time, the transmitter-receiver 31 transmits the IP address of the terminal. Accordingly, the transmitter-receiver 51 of the service providing system 5 receives the request to authenticate the ID and the IP address of the communication terminal 3.

Next, the storing-reading unit 79 of the authentication system 7 searches, by using the combination of the user ID (part to be authenticated) and the password that are received at step S27 as a search key, the authentication management table for the same combination of the part to be authenticated and the password. By using the result of the searching, the authentication unit 72 performs authentication (step S28). When the same combination is managed, the authentication unit 72 determines that the user of the communication terminal 3 is a valid user to receive the services from the service providing system 5 and, when the same combination is not managed, determines that the user of the communication terminal 3 is not a valid user to receive services from the service providing system 5.

As illustrated in FIG. 13, the authentication unit 72 of the authentication system 7 encrypts a token (transmission authority) (step S41). The transmitter-receiver 71 then transmits the result of authenticating the ID to the communication terminal 3 according to the IP address of the communication terminal 3 that is received at step S27 (step S42). The authentication result represents whether the communication terminal 3 is valid and contains the token encrypted at step S41. Accordingly, the transmitter-receiver 31 of the communication terminal 3 receives the result of authenticating the user. The case where the user has valid authority will be described below.

The transmitter-receiver 31 of the communication terminal 3 transmits a session establishment request to the service providing system 5 (step S43). The session establishment request contains the terminal ID and the encrypted token that is received at step S42. Accordingly, the transmitter-receiver 51 of the service providing system 5 receives a session establishment request.

The authentication unit 52 of the service providing system 5 decrypts the encrypted token that is received at step S43 (step S44). The authentication unit 52 of the service providing system 5 and the authentication unit 72 of the authentication system 7 have a common key (or a public key) in advance and thus the authentication unit 52 is able to decrypt the token.

Figure 14:
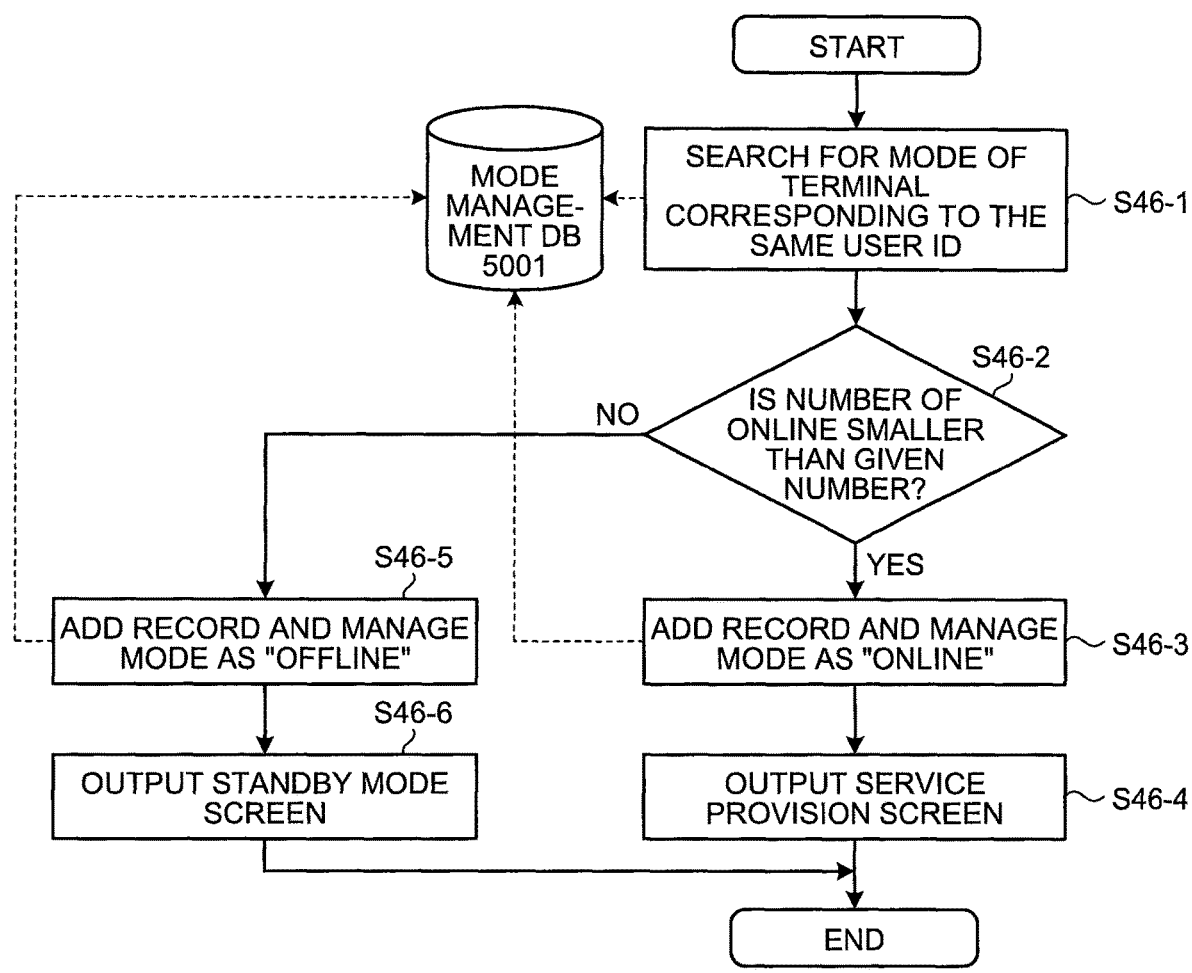
FIG. 14 is a flowchart illustrating a communication mode of a communication terminal and management of a communication partner.

The authentication unit 52 authenticates the token on the basis of the decrypted token (step S45). The service providing system 5 then manages the communication mode of the communication terminal 3 and the communication partner (step S46). With reference to FIG. 14, management of the communication mode of the communication terminal 3 and the communication partner will be described. FIG. 14 is a flowchart illustrating management of the communication mode of the communication terminal and the communication partner.

As illustrated in FIG. 14, first of all, the searching unit 53 performs searching for the number of sets of communication mode information that indicate the online mode and that are associated with other terminal IDs containing the same user ID as that of the user ID contained in the terminal ID of the communication terminal 3 that is the source of communication (step S46-1). The determining unit 54 determines whether the number of sets of communication mode information indicating the online mode is smaller than a given number (for example, 10) (step S46-2). When the number of sets of communication mode information indicating the online mode is smaller than the given number (YES), the storing-reading unit 59 manages the terminal ID of the communication terminal 3 that is the source of communication, the communication mode information indicating the "online" mode, and the IP address of the communication terminal 3 that is the source of communication in association with each other (step S46-3). The storing-reading unit 59 then outputs data of a "service provision screen" stored in advance from the storage unit 5000 (step S46-4).

At step S46-2, when the number of sets of communication mode information indicating the online mode is not smaller than the given number (NO), that is, equal to or larger than the given number, according to the result of the searching by the searching unit 53, the storing-reading unit 59 manages the terminal ID of the communication terminal 3 that is the source of communication, the communication mode information indicating "offline", and the IP address of the communication terminal 3 that is the source of communication in association with one another other (step S46-5). The storing-reading unit 59 then outputs data of a "standby mode screen" stored in advance from the storage unit 5000 (step S46-6).

FIG. 13 will be referred back here. The transmitter-receiver 51 of the service providing system 5 then transmits request result information representing a result of the request at step S43 to the communication terminal 3 (step S47). The transmitter-receiver 31 of the communication terminal 3 receives request result information.

The display controller 33 of the communication terminal 3 causes the display 508 of the communication terminal 3 to display screen data contained in the request result information (herein, the communication terminal 3b) (step S48). In this case, when the request result information contains the data of the service provision screen, the display controller 33 causes the display 508 to display a service provision screen s2 illustrated in FIG. 15A. The service provision screen s2 represents that it is possible to receive provision of services. The screen represents, as an example, the content of services representing that it is possible to remotely operate user's own another communication terminal 3. On the service provision screen s2, an input field b21 for inputting the terminal ID of another communication terminal to be remotely operated and a "service start request" button b2 for making a request to start the services actually after the user inputs the terminal ID in the input filed b21 are displayed.

Figure 15A:
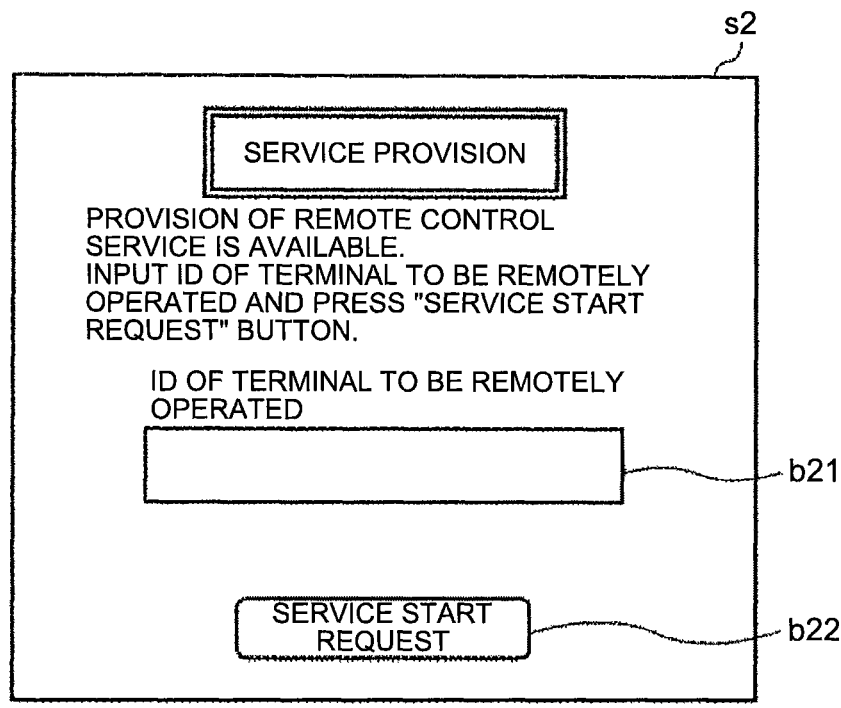
FIG. 15A illustrates an exemplary display of a request result screen.
Figure 15B:
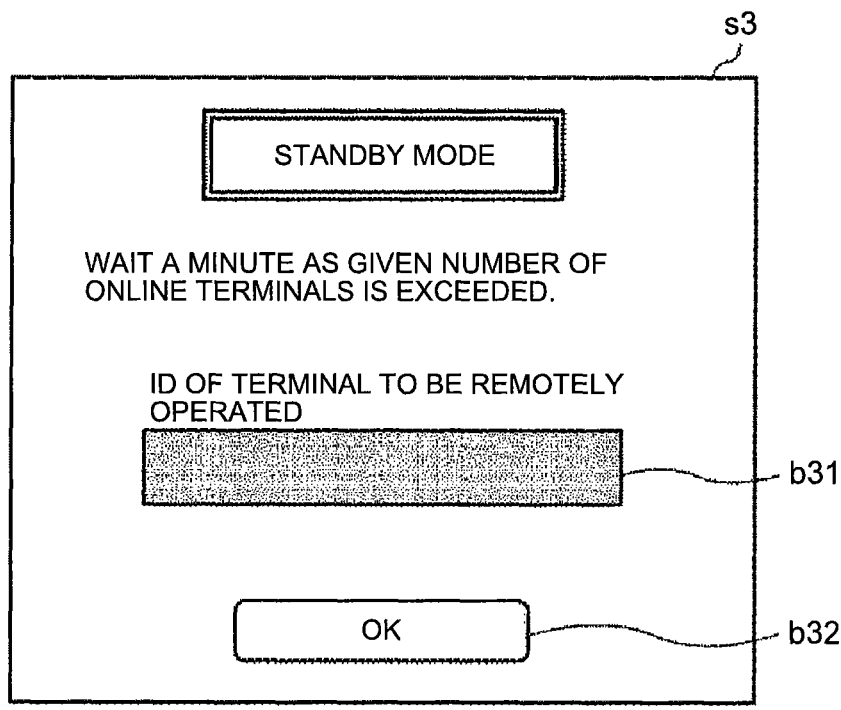
FIG. 15B illustrates another exemplary display of the request result screen.

On the other hand, when the request result information contains data of the standbymode screen, the display controller 33 displays the standby mode screen s3 illustrated in FIG. 15B. The standby mode screen s3 represents that the communication terminal 3 that is the source of communication and that issues a login request is not able to receive the services and is in the standby mode. The screen represents, as an example, the content of services representing that it is not possible to remotely operate user's own another communication terminal 3 and the standby mode is kept until the remote operation is enabled. Furthermore, on the service provision screen s3, an input field b31 that is masked to prevent the user from inputting the terminal ID of another communication terminal to be remotely operated and an "OK" button b32 for the user to close the service provision screen s3 after checking are displayed.

With reference to FIGS. 16 to 18, a remote operation service for enabling the communication terminal 3b to remotely operate the communication terminal 3a will be described as an exemplary provision of service. FIG. 16 is a sequence chart illustrating a remote operation process. The communication terminals 3a and 3b illustrated in FIG. 1 are communication terminals owned by the same user. The terminal IDs of the communication terminals 3a and 3b are managed as the terminal ID of the source of communication and the terminal ID of the communication partner with whom it is possible to communicate in the communication partner management table and the communication terminals 3a and 3b are in a mode where the communication terminal 3a is able to start a remote operation on the communication terminal 3b or the communication terminal 3b is able to start a remote operation on the communication terminal 3a.

In this case, for example, even when the user is able to independently receive provision of service by using the terminal IDs different between the communication terminals 3a and 3b, the authentication system 7 performs the same authentication by using the same combination of the user ID (herein, "asai@myhost.ricoo.com") and the password (herein, "aaaa"). Thus, the user need not register a terminal ID and a password with respect to each of the communication terminals 3a and 3b for multiple sets of authentication.

When the user of the communication terminal 3b inputs the terminal ID of the communication terminal 3a to be remotely operated in the input field b21 illustrated in FIG. 15A and presses the "service start request" button b22, the accepting unit 32 of the communication terminal 3b accepts the specifying of the terminal to be remotely operated and the remote operation start request (step S61). The communication terminal 3b requests the communication terminal 3a to cause the shooting device 10 start shooting as an exemplary remote operation herein. Accordingly, the transmitter-receiver 31 of the communication terminal 3b transmits a communication start request (herein, the remote operation start request) to the service providing system 5 (step S62). The start request contains the terminal ID of the communication terminal 3b that is the source of communication (herein, the source of remote operation) and the terminal ID of the communication terminal 3a that is the communication partner (herein, the terminal to be remote operated). The transmitter-receiver 51 of the service providing system 5 thus receives the communication start request.

The service providing system 5 then performs a process of determining whether the remote operation is available (step S63). With reference to FIG. 17, the process of determining whether the remote operation is available will be described in detail. FIG. 17 is a flowchart illustrating the process of determining whether the remote operation is available.

As illustrated in FIG. 17, the searching unit 53 searches the mode management table (refer to FIG. 8) by using the terminal ID of the communication terminal 3a serving as the communication partner, which is the terminal ID received at step S62 (step S63-1). The determining unit 54 further determines whether the terminal ID of the communication terminal 3a serving as the communication partner is managed in the mode management table (step S63-2). When the determining unit 54 determines that the terminal ID of the communication terminal 3a serving as the communication partner is managed in the mode management table (YES), the determining unit 54 determines whether the communication mode information corresponding to the terminal ID of the communication terminal 3a serving as the communication partner is managed as "online" in the mode management table (see FIG. 8) (step S63-3). When the determining unit 54 determines that the communication mode information is managed as "online" (YES), the determining unit 54 determines whether the terminal ID of the communication terminal 3b serving as the source of communication and the terminal ID of the communication terminal 3a serving as the communication partner contain the same user ID (step S63-4). When the determining unit 54 determines that the terminal IDs contain the same user ID (YES), refer back to FIG. 16 and proceed to the process at step S65.

On the other hand, when the determining unit 54 determines that the terminal ID of the communication terminal 3a serving as the communication partner is not managed in the mode management table (NO) at step S63-2 described above, the storing-reading unit 59 outputs data of a communication-unavailable screen (herein, a remote-operation-unavailable screen) that is stored in advance in the storage unit 5000 (step S63-5). Similarly, when the determining unit 54 determines that the communication mode information is not managed as "online", in other words, is managed as "offline", at step S63-3 (NO), or when the determining unit 54 determines that the terminal IDs do not contain the same user ID (NO) at step S63-4, the storing-reading unit 59 outputs the data of the communication-unavailable screen previously stored in the storage unit 5000. In this case, refer back to FIG. 16 where the transmitter-receiver 51 transmits request result information that contains data of a request result screen and that indicates that communication is not available to the communication terminal 3b (step S64). Accordingly, the transmitter-receiver 31 of the communication terminal 3b receives the request result information. In this case, at step S71 to be described below, the display controller 33 of the communication terminal 3b displays the remote-operation-unavailable screen s4 like that illustrated in FIG. 18A.

The case where the process proceeds to the process at step S65 will be described below.

As illustrated in FIG. 16, by searching the mode management table by using the terminal ID of the communication terminal 3a serving as the communication partner, which is the terminal ID received at step S62, the storing-reading unit 59 reads the corresponding IP address of the communication terminal 3a (step S65). The transmitter-receiver 51 then transmits a communication start request (herein, a remote operation start request) to the communication terminal 3a represented by the IP address that is read at step S65 (step S66). The communication start request contains the terminal ID of the communication terminal 3b serving as the source of transmission and the terminal ID of the communication terminal 3a serving as the communication partner. Accordingly, the transmitter-receiver 31 of the communication terminal 3a receives the communication start request.

The short-distance communication unit 38 of the communication terminal 3a prepares for a remote operation to cause the shooting device 10 to start imaging a subject or scenery (step S67). Accordingly, the transmitter-receiver 31 of the communication terminal 3a transmits a request result of the communication start request (herein, preparation completed) to the service providing system 5 (step S68). Accordingly, the transmitter-receiver 51 of the service providing system 5 receives the request result.

In the service providing system 5, the storing-reading unit 59 outputs data of a communication-available screen (herein, a remote-operation-available screen) that is stored in the storage unit 5000 in advance (step S69). The transmitter-receiver 51 then transmits request result information that contains data of the communication-available screen and that indicates that communication is available to the communication terminal 3b serving as the source of transmission at step S62 (step S70). Accordingly, the transmitter-receiver 31 of the communication terminal 3b receives the request result information.

Figure 18A:
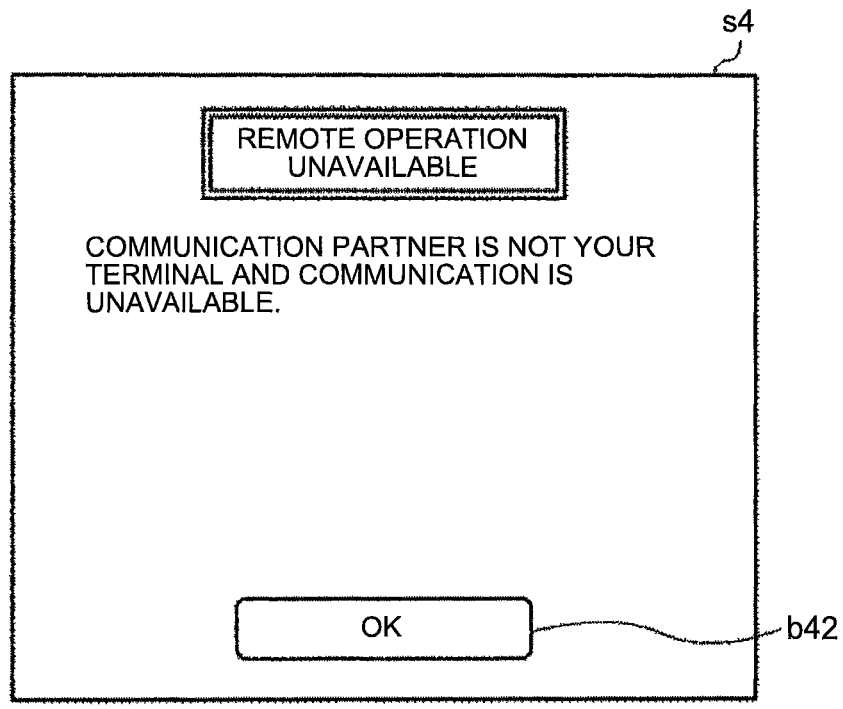
FIG. 18A is an exemplary display of the request result screen.
Figure 18B:
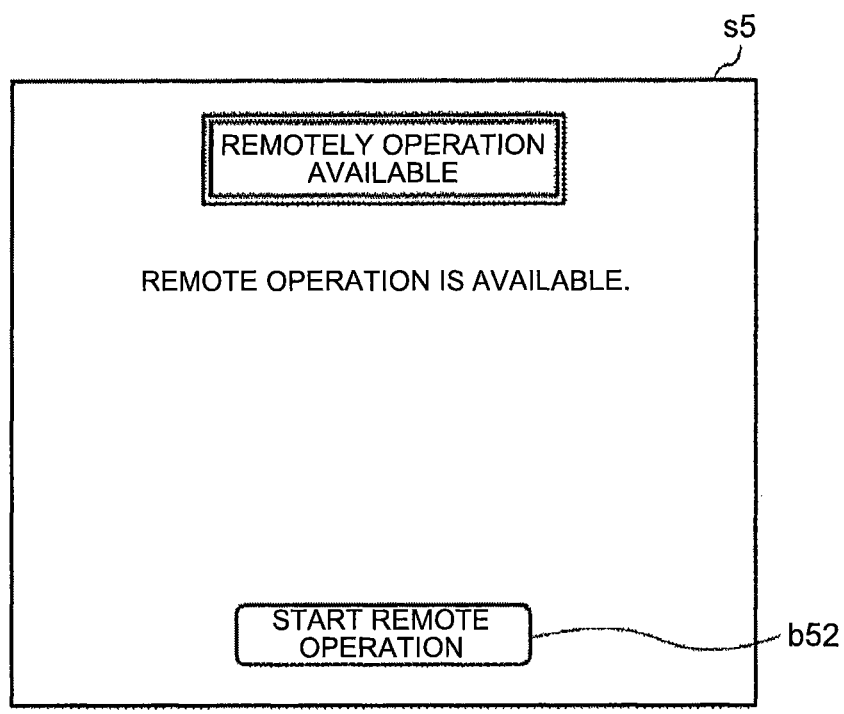
FIG. 18B is another exemplary display of the request result screen.

In the communication terminal 3b, the display controller 33 displays a remote-operation-available screen a5 like that illustrated in FIG. 18B (step S71).

A remote-operation-unavailable screen s4 illustrated in FIG. 18A indicates that communication is not available because the communication terminal 3a serving as the communication partner is not a communication terminal of the user. On the remote-operation-unavailable screen s4, an "OK" button b42 for the user to close the remote-operation-unavailable screen s4 after checking is displayed. On the other hand, a remote-operation-available screen s5 illustrated in FIG. 18B indicates that communication is available, because the communication terminal 3a is a communication terminal of the user of the source of communication. On the remote-operation-available screen s5, a "remote operation start" button b52 for actually starting the remote operation is displayed. When the user presses the "remote operation start" button b52, for example, the communication terminal 3a is enabled to perform a remote operation on the shooting device 10 to, for example, start or end shooting.

Figure 19:
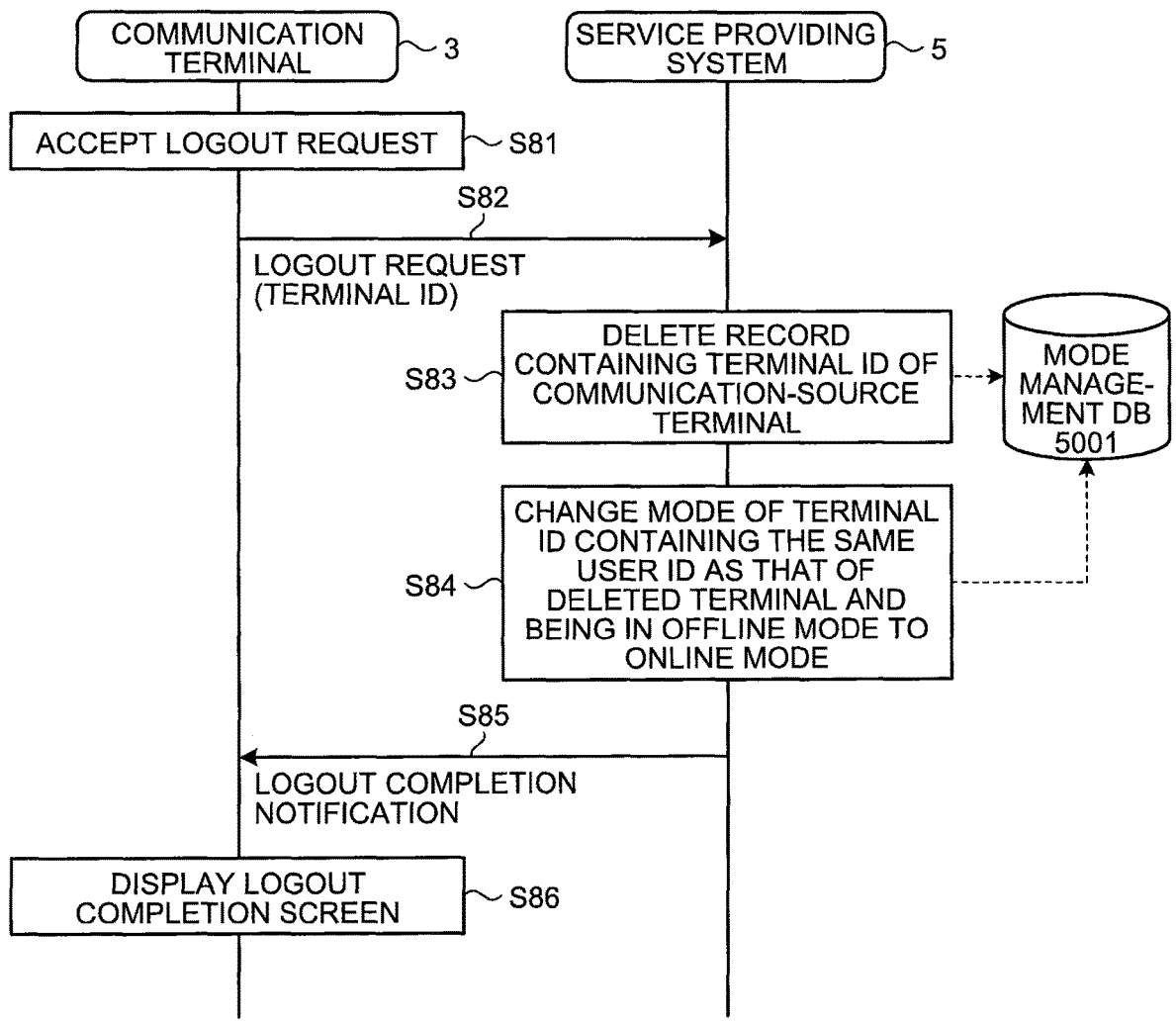
FIG. 19 is a sequence chart illustrating a logout process.
Figure 20A:
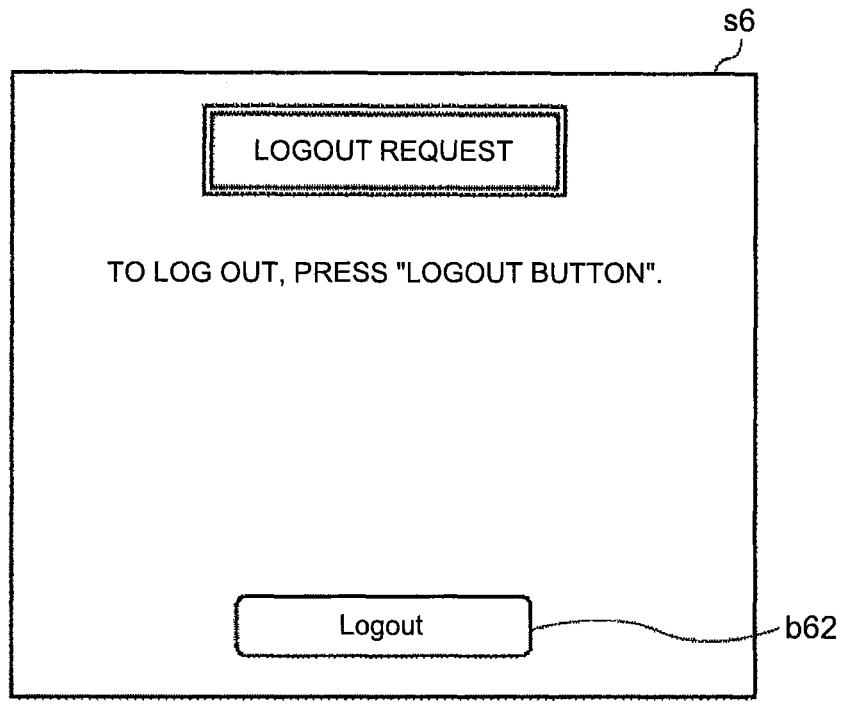
FIG. 20A illustrates an exemplary display of a logout screen.
Figure 20B:
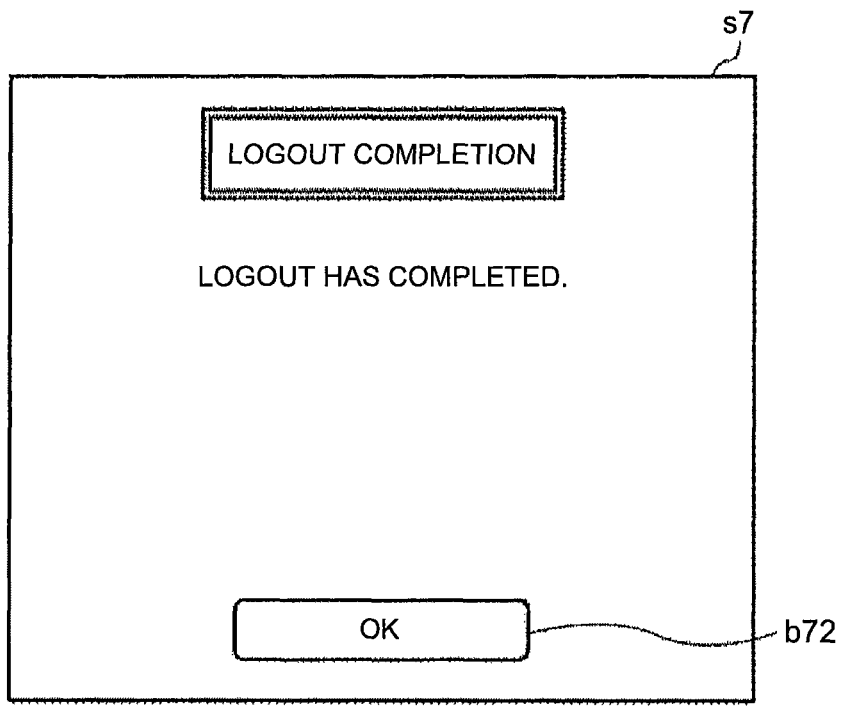
FIG. 20B illustrates another exemplary display of the logout screen.

With reference to FIGS. 19, 20A, and 20B, the process performed by the communication terminal 3 to issue a logout request to the service providing system 5 will be described. FIG. 19 is a sequence chart illustrating a logout process. FIGS. 20A and 20B are each exemplary display of a logout screen.

As illustrated in FIG. 19, when the user presses a "Logout" button b62 on the logout request screen s6 that is displayed by the display controller 33 of the communication terminal 3, the accepting unit 32 accepts a logout request (step S81).

The transmitter-receiver 31 transmits the logout request to the service providing system 5 (step S82). The logout request contains the terminal ID of the communication terminal 3 serving as the source of communication. Accordingly, the transmitter-receiver 51 of the service providing system 5 receives the logout request.

The deleting unit 55 of the service providing system 5 deletes the record containing the terminal ID of the communication terminal 3 serving as the source of communication in the mode management table (refer to FIG. 8) (step S83). Furthermore, when the communication mode information associated with another terminal ID containing the same user ID as the user ID that is contained in the terminal ID in the record deleted by the deleting unit 55 indicates the offline mode, the storing-reading unit 59 changes the communication mode information from "offline" to "online" and manages the communication mode information in the mode management table (step S84). In this case, when there are other multiple communication terminals on which sets of communication mode information associated with other terminal IDs containing the same user ID as the user ID that is contained in the terminal ID in the record deleted by the deleting unit 55 indicate the offline mode, the storing-reading unit 59 changes the communication mode information to online according to the ascending order in which the transmitter-receiver 51 receives the sets of communication mode information of other multiple communication terminals. For example, in the case of the mode management table illustrated in FIG. 8, when a record containing a given terminal ID is deleted, offline (1) associated with another terminal ID containing the same user ID as that of the given terminal ID is changed to online. When a record containing the terminal ID of the same user ID is deleted, offline (2) associated with another terminal ID containing the same user ID as that of the terminal ID is changed to online. The storing-reading unit 59 may change offline (1) to online and also make a change to bring online (2) forward to online (1).

The transmitter-receiver 51 transmits a logout completion notification to the communication terminal 3 serving as the source of transmission (step S85). Accordingly, the transmitter-receiver 31 of the communication terminal 3 receives the logout completion notification. The display controller 33 of the communication terminal 3 then causes the display 317 (508) of the communication terminal 3 to display a logout completion screen s7 like that illustrated in FIG. 20B (step S86). Furthermore, on the logout completion screen s7, an "OK" button b72 for the user to close the logout completion screen s7 after checking is displayed.

Main Effect of Embodiment

As described above, according to the embodiment, the terminal ID contains the user ID (part to be authenticated) and the part not to be authenticated. Thus, once the user registers the combination of the part to be authenticated and the password, it is unnecessary to register with respect to each communication terminal even when the user uses multiple communication terminals whose corresponding parts to be authenticated are different from one another and this leads to an effect that it is possible to reduce the work of the user to register to communicate the services.

Furthermore, with respect to control on starting communication between communication terminals, the service providing system 5 uses the mode management table (see FIG. 8) used for the login process and admits starting communication when the terminal ID of the source of communication and the terminal ID of the communication partner contain a common user ID (see step S63-4). Accordingly, it is possible to control starting communication after security is ensured without bothering to build an address list and this leads to an effect that it is possible to prevent an increase in the work of the user to register in the address list.

The determining unit 54 of the service providing system 5 determines whether the terminal ID of the communication partner is managed in the mode management table (refer to FIG. 8) and does not admit starting communication when it is determined that the terminal ID of the communication partner is not registered (see step S63-2). Accordingly, it is possible to omit the process at step S63-3 and the following and this leads to an effect that it is possible to promptly respond to a request to start communication.

Furthermore, the service providing system 5 permits communication among only a given number of communication terminals even among communication terminals of the same user (refer to S46-2 and S46-3). Accordingly, it is possible to reduce the work of the service providing system 5 that provides services and simply achieve ensuring equitability among users (for example, prevent a specific user from occupying the service providing system 5). For example, there is a possibility that the user causes a large number of his/her own communication terminals to login the service providing system 5 in order to receive the services with a large number of his/her own communication terminals 3 and thus a large number of sessions are generated; however, communication among only the given number of terminals is permitted and thus it is possible to reduce the work of the service providing system 5.

Furthermore, on receiving a logout request from the communication terminal 3, the service providing system 5 deletes the record containing the terminal ID of the communication terminal 3 from the mode management table (refer to FIG. 8) and changes the communication mode of the terminal ID of the same user in the "online" standby mode from "offline" to "online" (refer to step S84). Accordingly, it is unnecessary for the user to make a request to change from "offline" to "online" to the service providing system 5 and thus it is possible to reduce the user's work of the process.

Figure 21:
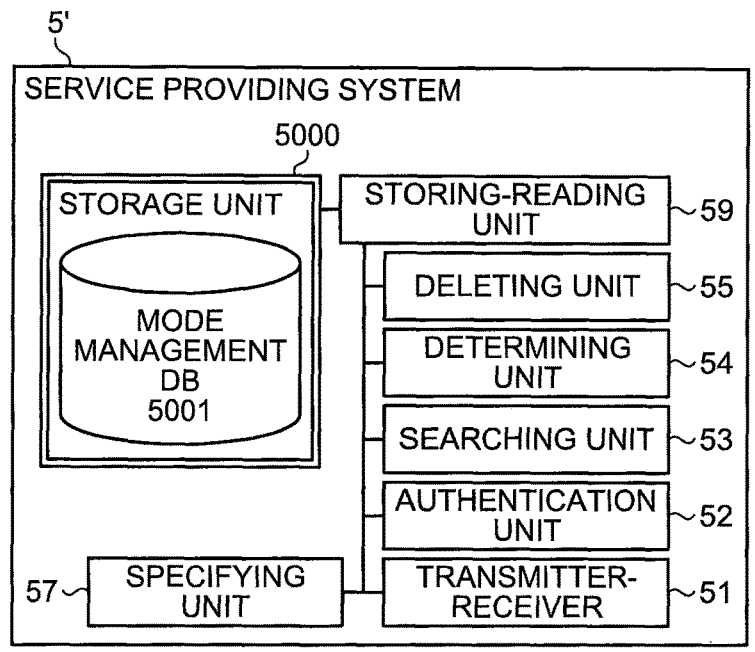
FIG. 21 is a functional block diagram of Modification 1.
Figure 22:
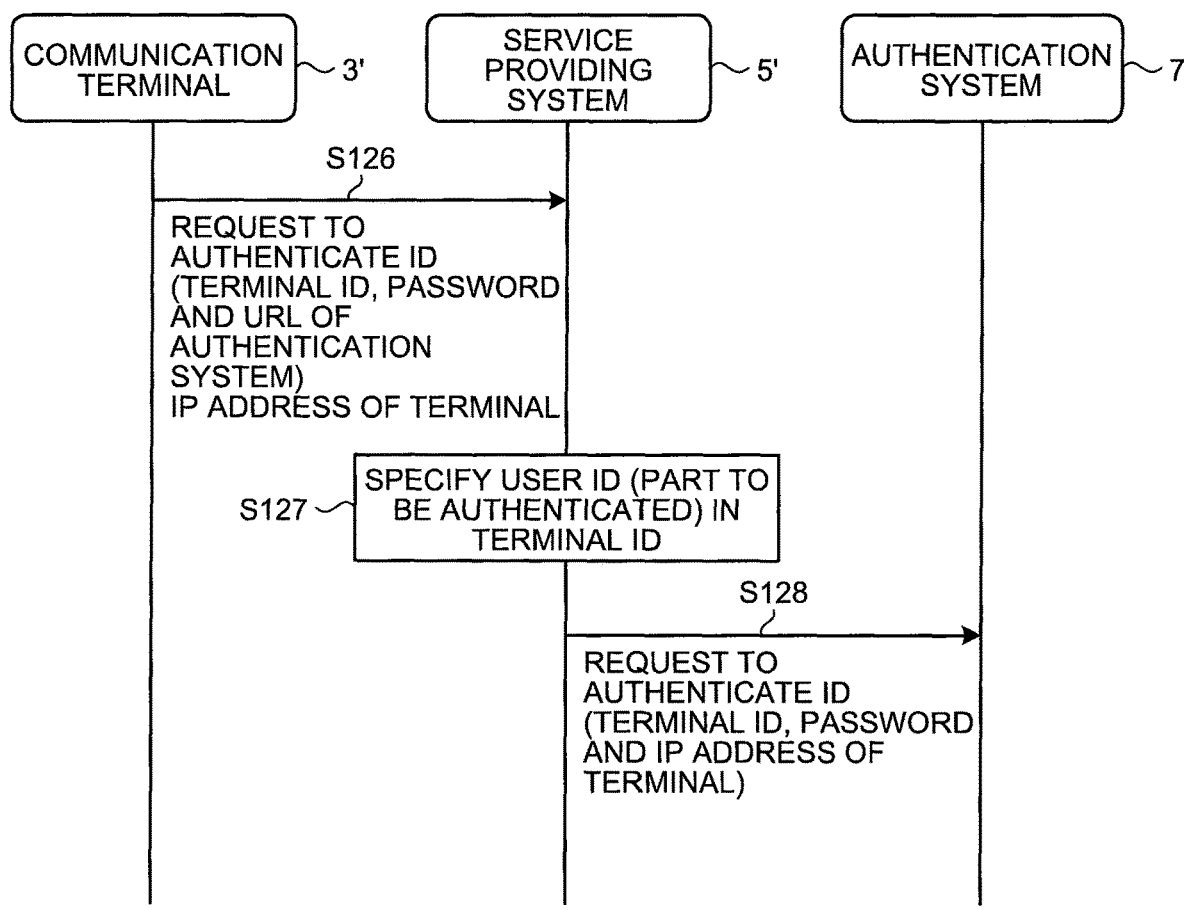
FIG. 22 is a sequence chart illustrating an authentication process of Modification 1.

Modification 1 With reference to FIGS. 21 and 22, Modification 1 of the embodiment will be described. FIG. 21 is a functional block diagram of a communication terminal of Modification 1. FIG. 22 is a sequence chart illustrating part of an authentication process of Modification 1.

The communication terminal 3 specifies a user ID (part to be authenticated) in a terminal ID at step S28 in the above-described embodiment, while a service providing system 5' specifies a user ID in a terminal ID at step S128 in Modification 1.

As illustrated in FIG. 21, in Modification 1, there is the service providing system 5' that includes a specifying unit 57. The specifying unit 57 has the same function as that of the specifying unit 37. In this case, there is a communication terminal 3' not including the specifying unit 37 and there is an authention system 7 having the same configuration as that illustrated in FIG. 7. In FIG. 21, the same functions as those in FIG. 7 are denoted with the same reference numerals as those in FIG. 7, and descriptions thereof will be omitted.

With reference to FIG. 22, the process or operations of Modification 1 will be described. In Modification 1, the same process or operations as those at steps S21 to S25, S41 to S48, S61 to S71, and S81 to S86 of the above-described embodiment are performed, and therefore Modification of steps S26 and S27 will be described.

As illustrated in FIG. 22, the transmitter-receiver 31 of the communication terminal 3' transmits a request to authenticate an ID (here, a terminal ID) to the service providing system 5' (step S126). The authentication request contains the terminal ID of the communication terminal 3', the password that is accepted at step S25 and the URL of a chosen authentication system. At that time, the transmitter-receiver 31 also transmits the IP address of the terminal. Accordingly, the transmitter-receiver 51 of the service providing system 5' receives the request to authenticate the ID and the IP address of the communication terminal 3'.

The specifying unit 57 of the service providing system 5' specifies a user ID (part to be authenticated) among a terminal ID (step S127). The transmitter-receiver 31 transmits a request to authenticate the ID (herein, the user ID) to the authentication system 7 that is specified by the URL received at step S126 (step S128). The request to authenticate the ID contains the user ID that is specified at step S127, the password that is accepted at step S25, and the IP address of the terminal that is received at step S126. Thus, the transmitter-receiver 71 of the authentication system 7 receives the request to authenticate the ID. Then, the same process or operations as those at step S28 and the following illustrated in FIG. 11 will be performed.

When the transmitter-receiver 71 of the authentication system 7 transmits the result of authenticating the ID to the communication terminal 3' as at step S42 in FIG. 13, the IP address of the terminal that is received at step S128 is used as the address.

As described above, Modification 1 achieves the same effect as that of the above-described embodiment.

Modification 2

Figure 23:
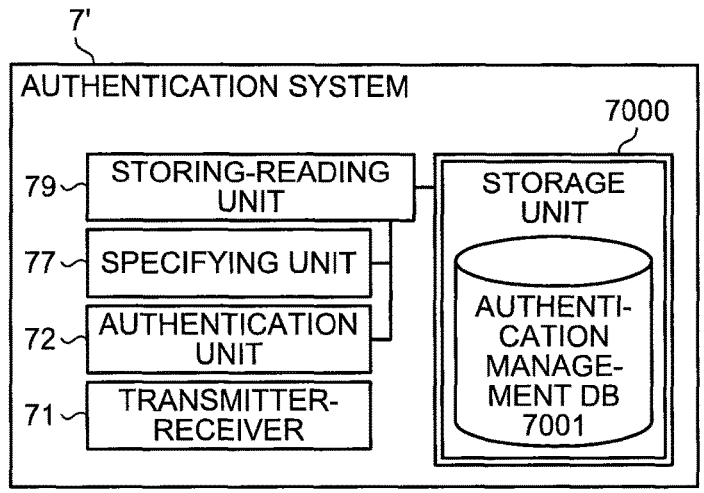
FIG. 23 is a functional block diagram of Modification 2.
Figure 24:
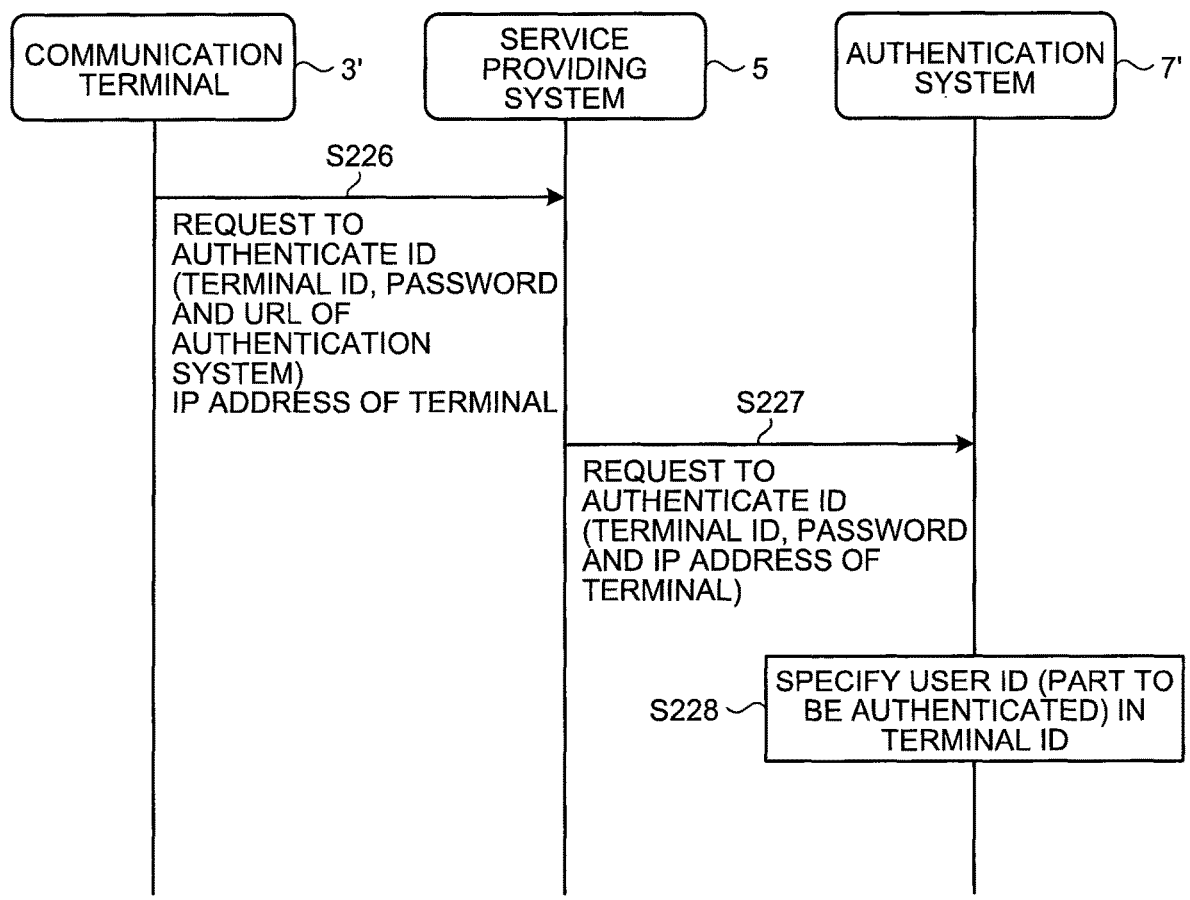
FIG. 24 is a sequence chart illustrating the authentication process of Modification 2.

With reference to FIGS. 23 and 24, Modification 2 of the embodiment will be described. FIG. 23 is a functional block diagram of an authentication system of Modification 2. FIG. 24 is a sequence chart illustrating part of the authentication process of Modification 2.

In the above-described embodiment, the service providing system 5 takes out a part to be authenticated in a terminal ID at step S28, while an authentication system 7' takes out a part to be authenticated in a terminal ID at step S228 in Modification 2.

In the embodiment, the communication terminal 3 specifies the user ID (part to be authenticated) in the terminal ID at step S28, while the authentication system 7' specifies a user ID of a terminal ID at step S228 in Modification 2.

As illustrated in FIG. 23, there is the authentication system 7' including a specifying unit 77 in Modification 2. The specifying unit 77 has the same function as that of the specifying unit 57. In this case, there is the communication terminal 3' not including the specifying unit 37 and there is the service providing system 5 having the same configuration as that illustrated in FIG. 7. In FIG. 23, the same functions as those in FIG. 7 will be denoted with the same reference numerals as those in FIG. 7, and descriptions thereof will be omitted.

With reference to FIG. 24, the process or operations of Modification 2 will be described. In Modification 2, the same process or operations as those at steps S21 to S25, S41 to S48, S61 to 571, and 581 to S86 of the above-described embodiment are performed, and therefore Modification of steps S26 and S27 will be described.

As illustrated in FIG. 24 and as at step S126, the transmitter-receiver 31 of the communication terminal 3' transmits a request to authenticate an ID (herein, a terminal ID) to the service providing system 5' (step S226). The authentication request contains the terminal ID of the communication terminal 3', the password that is accepted at step S25, and the URL of the chosen authentication system. The transmitter-receiver 31 also transmits the IP address of the terminal. Accordingly, the transmitter-receiver 51 of the service providing system 5' receives the request to authenticate the ID and the IP address of the communication terminal 3'.

The transmitter-receiver 51 transmits a request to authenticate an ID (herein, a terminal ID) to the authentication system 7' (step S227). The request to authenticate the ID contains the terminal ID and the password that are accepted at step S25 and the IP address of the terminal that is received at step S226. Accordingly, the transmitter-receiver 71 of the authentication system 7' receives the request to authenticate the ID.

The specifying unit 77 of the authentication system 7' specifies the user ID (part to be authenticated) in the terminal ID (step S228). Then, the process or operations at S28 and the following illustrated in FIG. 11 will be performed.

When the transmitter-receiver 71 of the authentication system 7' transmits the result of authenticating the ID to the communication terminal 3' as at step S42 in FIG. 13, the IP address of the terminal received at step S227 is used as the address.

As described above, according to Modification 2, the same effect as that of the embodiment is achieved.

REFERENCE SIGNS LIST

1 Service communicating system
3 Communication terminal
3*a* Communication terminal
3*b* Communication terminal
3*c* Communication terminal
5*a* Service providing system
5*b* Service providing system
7*a* Authentication system
7*b* Authentication system
7*c* Authentication system
9 Communication network
10 Shooting device
31 Transmitter-receiver
32 Accepting unit
33 Display controller
37 Specifying unit
38 Short-distance communication unit
39 Storing-reading unit
51 Transmitter-receiver (exemplary receiver, exemplary transmitter)

52 Authentication unit
53 Searching unit (exemplary searching unit)
54 Determining unit (exemplary determining unit)
55 Deleting unit (exemplary deleting unit)
59 Storing-reading unit
71 Transmitter-receiver
72 Authentication unit
77 Specifying unit
5000 Storage unit
5001 Mode management DB (exemplary management unit)
7001 Authentication management DB

CITATION LIST

Patent Literature

PTL 1: Japanese Laid-open Patent Publication No. 2015-201827

The invention claimed is:

1. A service providing apparatus comprising:
a transceiver configured to exchange data with communication terminals including a first communication terminal and a second communication terminal;
a memory; and
processing circuitry configured to,
store, in the memory, management information associating terminal identification information and communication mode information such that the communication mode information indicates which of the communication terminals are set to an online communication mode and which of the communication terminals are set to an offline communication mode,
receive, via the transceiver, a communication request from the first communication terminal to establish a communication session with the second communication terminal, the communication request including the terminal identification information associated with the first communication terminal and the terminal identification information associated with the second communication terminal,
determine whether a portion of the terminal identification information of the second communication terminal is same as a portion of the terminal identification information of the first communication terminal,
determine, based on the management information, a number of the communication terminals set to the online communication mode that are associated with the portion of the terminal identification information of the first communication terminal, and
selectively relay, via the transceiver, the communication request to the second communication terminal to start the communication session between the first communication terminal and the second communication terminal, in response to the portion of the terminal identification information of the second communication terminal being the same as the portion of the terminal identification information of the first communication terminal and the number of the communication terminals set to the online communication mode that are associated with the portion of the terminal identification information of the first communication terminal being smaller than a threshold.

2. The service providing apparatus according to claim 1, wherein the processing circuitry is configure to,
determine whether the terminal identification information of the second communication terminal is stored in the memory, and
not relay the communication request to the second communication terminal, in response to the terminal identification information of the second communication terminal not being stored in the memory.

3. The service providing apparatus according to claim 2, wherein
the processing circuitry is configured to,
store the management information such that, for a respective one of the communication terminals, the communication mode information associated therewith indicates whether the respective one of the communication terminals is in the online communication mode or the offline communication mode,
determine whether the second communication terminal is in the online communication mode or the offline communication mode by reading the management information stored in the service providing apparatus, and
selectively relay the communication request to the second communication terminal in response to the second communication terminal being in the online communication mode.

4. The service providing apparatus according to claim 1, wherein the processing circuitry is configured to,
associate, in the management information, the terminal identification information of the first communication terminal and the communication mode information in response to the number of the communication terminals set to the online communication mode that are associated with the portion of the terminal identification information of the first communication terminal being smaller than the threshold.

5. The service providing apparatus according to claim 4, wherein the processing circuitry is configured to set the communication mode information for the first communication terminal to an offline communication mode, in response to the number of the communication terminals set to the online communication mode that are associated with the portion of the terminal identification information of the first communication terminal being greater than or equal to than the threshold such that the processing circuitry is configured to not relay the communication request to the second communication terminal, in response to the number of the communication terminals set to the online communication mode that are associated with the portion of the terminal identification information of the first communication terminal being greater than or equal to the threshold.

6. The service providing apparatus according claim 1, wherein the processing circuitry is configured to,
receive, via the transceiver, a logout request from the first communication terminal, and
delete, in the management information a record containing the terminal identification information of the first communication terminal in response to the logout request.

7. The service providing apparatus according to claim 6, wherein the processing circuitry is configured to set, in the management information, the communication mode information associated with the terminal identification information of other communication terminals to an online communication mode, in response to the portion of the terminal identification information of the other communication terminals being the same as the portion of the terminal identification information of the first communication terminal.

8. The service providing apparatus according to claim 7, wherein the processing circuitry is configured to set, in the management information, the communication mode information associated with the terminal identification information of the other communication terminals to the online communication mode in order according to receipt of the communication mode information of the other communication terminals.

9. The service providing apparatus according to claim 1, wherein the processing circuitry is one of associated with a single computer or distributed amongst a plurality of computers.

10. A service communicating system comprising:
the service providing apparatus according to claim 1,
the first communication terminal, and
the second communication terminal.

11. The service communicating apparatus according to claim 10, wherein
the first communication terminal or the second communication terminal is a mobile terminal, an information processing terminal, an office machine, a home electronic product, an electronic part, or a medical equipment.

12. A service providing method executed by a service providing system that apparatus configured to exchange data with communication terminals including a first communication terminal and a second communication terminal, the method comprising:
storing, in a memory, management information associating terminal identification information and communication mode information such that the communication mode information indicates which of the communication terminals are set to an online communication mode and which of the communication terminals are set to an offline communication mode;
receiving a communication request from the first communication terminal to establish a communication session with the second communication terminal, the communication request including the terminal identification information associated with the first communication terminal and the terminal identification information associated with the second communication terminal;
determining whether a portion of the terminal identification information of the second communication terminal is same as a portion of the terminal identification information of the first communication terminal;
determining, based on the management information, a number of the communication terminals set to the online communication mode that are associated with the portion of the terminal identification information of the first communication terminal; and
selectively relaying the communication request to the second communication terminal to start the communication session between the first communication terminal and the second communication terminal, in response to the portion of the terminal identification information of the second communication terminal being the same as the portion of the terminal identification information of the first communication terminal and the number of the communication terminals set to the online communication mode that are associated with the portion of the terminal identification information of the first communication terminal being smaller than a threshold.

13. A non-transitory computer-readable recording medium that contains a computer program that causes a computer to execute the method of claim 12.

14. The service communicating apparatus according to claim 1, wherein the portion of the terminal identification information of the first communication terminal is a login ID of a user associated with the first communication terminal and the portion of the terminal identification information of the second communication terminal is a login ID of a user associated with the second communication terminal.

15. The service communicating apparatus according to claim 1, wherein
the first communication terminal and the second communication terminal are configured to communicate via the communication session using an internet protocol (IP),
the second communication terminal is configured to communicate with an external device via a short-range radio communication protocol different from the internet protocol, and
the first communication terminal is configured to utilize the communication session with the second communication terminal via the internet protocol to remotely operate the external device connected to the second communication terminal via the short-range radio communication protocol such that, upon starting the communication session, the second communication terminal acts as an intermediary between the first communication terminal and the external device.

* * * * *